United States Patent
Murakami et al.

(10) Patent No.: US 6,801,636 B2
(45) Date of Patent: Oct. 5, 2004

(54) IMAGE PROCESSING APPARATUS AND METHOD, AND STORAGE MEDIUM

(75) Inventors: Tomochika Murakami, Kawasaki (JP); Keiichi Iwamura, Yokohama (JP); Yoshihiro Ishida, Yokohama (JP); Hiromitsu Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 09/770,668

(22) Filed: Jan. 29, 2001

(65) Prior Publication Data

US 2001/0017709 A1 Aug. 30, 2001

(30) Foreign Application Priority Data

Jan. 31, 2000 (JP) ........................................ 2000-021559
Jan. 31, 2000 (JP) ........................................ 2000-021563

(51) Int. Cl.$^7$ ................................................ G06K 9/00
(52) U.S. Cl. ...................... 382/100; 382/167; 382/203; 382/243; 382/296; 382/298; 382/319; 358/1.14
(58) Field of Search ................................. 382/100, 112, 382/135, 137, 138, 218, 243, 274, 165, 167, 169, 190, 199, 296, 298, 305, 319; 358/1.14, 3.28; 713/171; 380/55, 51; 283/17; 356/71; 902/7

(56) References Cited

U.S. PATENT DOCUMENTS

| | | | |
|---|---|---|---|
| 4,210,346 A | * 7/1980 | Mowry et al. | 283/94 |
| 4,307,899 A | * 12/1981 | Hoppe | 283/110 |
| 5,161,829 A | * 11/1992 | Detrick et al. | 283/91 |
| 5,561,534 A | 10/1996 | Ishida et al. | |
| 5,600,720 A | 2/1997 | Iwamura et al. | |
| 5,666,419 A | 9/1997 | Yamamoto et al. | |
| 5,694,486 A | 12/1997 | Shigeeda et al. | |
| 5,748,777 A | 5/1998 | Katayama et al. | |
| 5,757,961 A | 5/1998 | Yamakawa et al. | |
| 5,828,794 A | 10/1998 | Katayama et al. | |
| 5,835,639 A | * 11/1998 | Honsinger et al. | 382/278 |
| 5,933,528 A | 8/1999 | Katayama et al. | |
| 5,937,395 A | 8/1999 | Iwamura | |
| 6,044,182 A | * 3/2000 | Daly et al. | 382/284 |
| 6,088,454 A | 7/2000 | Nagashima et al. | |
| 6,111,994 A | 8/2000 | Katayama et al. | |
| 6,259,801 B1 | * 7/2001 | Wakasu | 382/100 |
| 6,427,020 B1 | * 7/2002 | Rhoads | 382/100 |
| 6,456,724 B1 | * 9/2002 | Watanabe | 382/100 |
| 6,535,616 B1 | * 3/2003 | Hayashi et al. | 382/100 |
| 6,668,068 B2 | * 12/2003 | Hashimoto | 382/100 |
| 2002/0145759 A1 | * 10/2002 | Miller | 358/3.28 |
| 2003/0025423 A1 | * 2/2003 | Miller et al. | 312/100 |
| 2003/0161496 A1 | * 8/2003 | Hayashi et al. | 382/100 |
| 2003/0215112 A1 | * 11/2003 | Rhoads et al. | 382/100 |
| 2004/0001608 A1 | * 1/2004 | Rhoads | 382/100 |

* cited by examiner

Primary Examiner—Timothy M. Johnson
Assistant Examiner—Barry Choobin
(74) Attorney, Agent, or Firm—Fitzpatrick, Cella, Harper & Scinto

(57) ABSTRACT

An image processing apparatus and method for deriving a digital watermark embedded in an image is provided which has a recognizing unit for recognizing a predetermined characteristic area in the image and a deriving unit for extracting the digital watermark from the image data in the recognized characteristic area.

35 Claims, 23 Drawing Sheets

IMAGE PROCESSING APPARATUS AND METHOD, AND STORAGE MEDIUM

BACKGROUND OF THE INVENTION

1. Field of the Invention

The present invention relates to an image processing apparatus and method and to a storage medium.

2. Related Background Art

It has been proposed recently to provide a color copy machine with an image recognition processing function or the like in order to prevent bills, securities and the like from being forged. If image data to be copied is judged that it is a forgery inhibited image, then a normal copy is not output, such as (1) the image data is printed out after it is painted out with some color, (2) the image data is printed out after some symbol or figure is superposed upon the image data, (3) the image data is printed out after its color or size is changed, (4) the image data is not printed out at all, or other countermeasures.

It is a principal rule for a copy machine to copy a matter placed on an original support excepting a copy inhibited matter such as bills. If an image like a bill (not a bill image but an image legally permitted to copy) is input, it is necessary to recognize that the input image is not a bill and to perform a copy operation. Strictly precise recognition is therefore required for a judgement that an image is not a forgery inhibited image.

The quality of an image obtained with a color scanner and a color printer which are more inexpensive than a color copy machine, has improved considerably nowadays. By connecting these scanner and printer to a personal computer, a combination of apparatus constituting a color copy machine can be realized and a forgery action can be performed. It is desired to provide an image processing system using an inexpensive color scanner and color printer with an image recognition processing function or the like in order to prevent bills, securities and the like from being forged.

Methods of judging whether an original is a copy inhibited matter have been proposed to date. With one method, a color spectrum distribution of pixel values (R, G and B pixel values of three-color signals) of image data obtained by scanning is compared with data stored in advance in a ROM. This comparison is made by calculating a total sum of absolute values of differences or by calculating correlation values between distributions. With another method, a partial or whole image pattern of an original is compared with pattern data stored in advance in a ROM or the like to calculate an evaluation value.

Information representative of a copy inhibited matter can be added to an original (printed matter) by using recent techniques called "digital watermark". Namely, a printed matter is produced from image data (electronic image data) with copy inhibited matter information. The image data is generated by embedding second digital data (sub-data) representative of copy inhibited matter information in original first digital image data (main data). The copy inhibited matter information can be derived from the image data with copy inhibited matter information before an original is printed, by using digital watermark techniques. The copy inhibited matter information can also be derived (extracted) from the image data of a printed matter (original) read with an original reader such as a color scanner, the printed matter being produced from the image data with copy inhibited matter information, if the reading and deriving conditions have integrity with the conditions under which the printed matter was produced. In this context, attention has been paid to the application of techniques "digital watermark" to prevent an illegal copy of an original (printed matter).

It is desired to realize forgery prevention of a copy inhibited matter at a low cost for inexpensive color scanners and color printers generally used in consumer markets, rather than for relatively expensive color copy machines. To this end, it is important to realize the recognition processing function for a copy inhibited matter by using mainly software, without using hardware with a number of electronic circuits.

If software is used for a judgement of a copy inhibited matter image at a high recognition precision, the total amount of calculations is large and it takes a very long time to recognize and judge a copy inhibited matter image.

If the calculation amount for the recognition/judgement is reduced, there is generally a tendency that it becomes difficult to judge a copy inhibited matter image at a high recognition precision. Therefore, it becomes very difficult to recognize a copy inhibited matter such as a bill from image data read under an intentionally altered read condition (angle, position and the like of an original placed on an original support). Conversely, even if an image like a bill (not a bill image but an image legally permitted to copy) is input, the image may be erroneously recognized as a copy inhibited matter image and a normal output is not performed. The function inherent to the image processing system is therefore lost.

During a digital image data producing process of scanners, facsimile apparatus, and digital copy machines, it is very difficult to read an original at a correct position on the original support without any inclination or transfer. A produced image has often a large blank area.

For recognizing a copy inhibited matter, the above-described methods are used. Namely, with one method, a color spectrum distribution of pixel values (R, G and B pixel values of three-color signals) of image data obtained by scanning is compared with data stored in advance in a ROM. This comparison is made by calculating a total sum of absolute values of differences or by calculating correlation values between distributions. With the other method, a partial or whole image pattern of an original is compared with pattern data stored in advance in a ROM or the like to calculate an evaluation value. Even with these methods, if the angle and position of an original placed on the original plane cannot be determined, there is a tendency that the total amount of calculations for the comparison with the pre-registered spectrum distribution data or image pattern data becomes large by leaps and bounds, as compared to the case that the angle and position can be determined.

It is desired to realize forgery prevention of a copy inhibited matter at a low cost for inexpensive color scanners and color printers, rather than for relatively expensive color copy machines. To this end, it is important to realize the recognition processing function for a copy inhibited matter by using mainly software, without using hardware with a number of electronic circuits.

If software is used for a judgement of a copy inhibited matter image at a high recognition precision, the total amount of calculations is large and it takes a very long time to recognize and judge a copy inhibited matter image. If the calculation amount for the recognition/judgement is reduced, there is generally a tendency that it becomes difficult to judge a copy inhibited matter image at a high recognition precision. Therefore, it becomes very difficult to recognize a copy inhibited matter such as a bill from image data read under an intentionally altered read condition (angle, position and the like of an original placed on an original support). Conversely, even if an image like a bill (not a bill image but an image legally permitted to copy) is input, the image may be erroneously recognized as a copy inhibited matter image and a normal output is not performed. The function inherent to the image processing system is therefore lost.

SUMMARY OF THE INVENTION

The invention has been made to solve the above-described problems. It is an object of the invention to provide an image processing apparatus constituting an image processing system, an image processing apparatus, and a storage medium storing a program for realizing such a method, the system being capable of providing a recognition/judgement process more precise than a conventional system, with a relatively small amount of calculations by using a personal computer system having an inexpensive image scanner and color printer.

It is another object of the present invention to provide an image processing apparatus and method and a storage medium, capable of distinguishing between images at a high precision even with a recognition/judgement process having a relatively small amount of calculations.

In order to achieve the above objects, an embodiment of the invention provides an image processing apparatus comprising: an unit for forming a predetermined characteristic area in an image; and an embedding unit for embedding a digital watermark in the characteristic area.

In order to achieve the above objects, an embodiment of the invention provides an image processing apparatus comprising: an input unit for inputting an image from an input image in a band area having a predetermined size as image data; an area recognizing unit for recognizing a predetermined characteristic area from the image data of the band area; a digital watermark data deriving (extracting) unit for deriving digital watermark data from the image data in the characteristic area recognized by the area recognizing unit; and a processing unit for processing the image data corresponding to the image, in accordance with a deriving result of the digital watermark data.

In order to achieve the above objects, an embodiment of the invention provides an image processing apparatus comprising: an image data input unit for printing out image data; a unit for acquiring a band area having a predetermined size from an image input from the image data input unit; a characteristic area recognizing unit for recognizing a predetermined characteristic area in the band area; a digital watermark data deriving unit for deriving digital watermark data from the recognized characteristic area; and a unit for judging from a deriving result by the digital watermark data deriving unit whether a printout of the image data is continued or intercepted.

In order to achieve the above objects, an embodiment of the invention provides an image processing apparatus for recognizing a copy inhibited image by executing a program, the apparatus comprising: an input unit for inputting image data of an image; a unit for determining a characteristic detection object area from the image data input by the input unit; a detecting unit for detecting a characteristic for recognizing the copy inhibited image from the image data of the image in the characteristic detection object area determined by the determining unit; and an output unit for outputting a signal representative of a detection result by the detecting unit.

DETAILED DESCRIPTION OF THE PREFERRED EMBODIMENTS

First Embodiment

A preferred embodiment of the invention will be described in which information representative of a copy inhibited matter (bill, securities) contained in an original is given by using techniques called "digital watermark". The description will be given assuming that a printed matter is produced from image data (electronic image data) with copy inhibited matter information, the image data being generated by embedding second digital data representative of copy inhibited matter information in original first digital image data. The digital watermark may be any digital watermark such as an invisible digital water mark produced by embedding data in image data at a specific spatial frequency and a visible digital watermark produced by embedding data of yellow-based dots hard to recognized by human eyes in image data.

As described earlier, in order to derive digital watermark embedded in image data by using digital watermark techniques, it is generally necessary to have integrity between the reading and deriving conditions and the conditions under which a printed matter embedded with digital water mark information (position and layout of the digital watermark in image data) was produced.

In this embodiment, it is assumed that information representative of a copy inhibited matter is embedded in a characteristic area of the matter by using digital watermark techniques.

Figure 1:
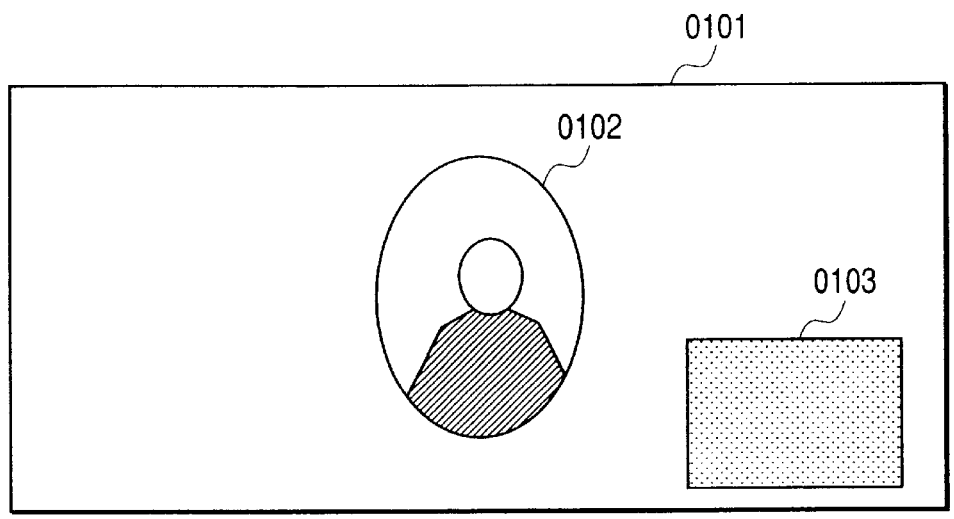
FIG. 1 is a diagram showing a bill which is an example of a copy inhibited matter.

FIG. 1 shows a bill as an example of the copy inhibited matter. Reference numeral 0101 generally indicates a bill in which a digital water mark for judging whether the bill is a forged bill is embedded in an area 0102 with a bill printing machine. In this embodiment, it is assumed that information for judging whether the bill is a copy inhibited matter is embedded in a characteristic area 0103 of the copy inhibited matter with a bill printing machine by using digital watermark techniques.

The characteristic area may be an area having specific color components, an area having a specific shape, or the like.

Figure 12:
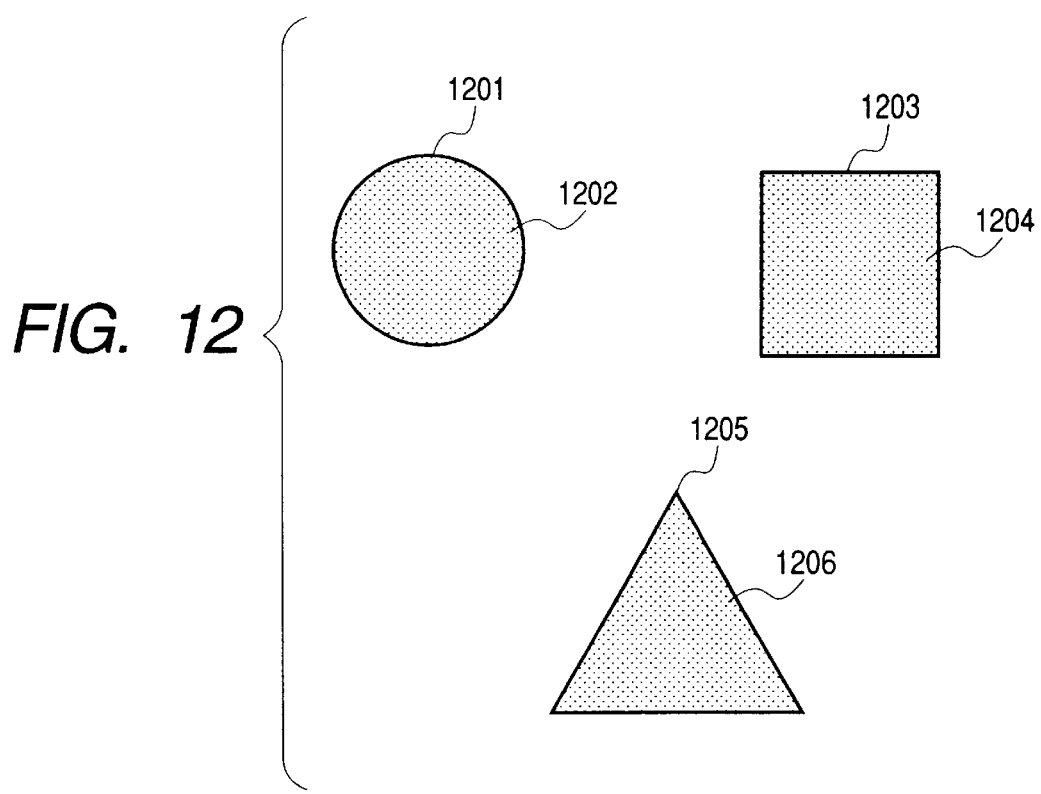
FIG. 12 is a diagram showing an example of a characteristic area in which a digital watermark is embedded.

FIG. 12 shows examples of the characteristic area (of a geometrical shape) 0103. A characteristic area 1201 has a circle shape, a characteristic area 1203 has a square shape, and a characteristic area 1205 has a triangle shape. The inner areas 1202, 1204 and 1206 of the characteristic areas are made of specific color components. The characteristic areas 1201 to 1203 are not limited only to those shown in FIG. 12, but other shapes may be used.

The characteristic areas illustratively shown in FIG. 12 can be derived relatively easily more than a digital watermark by using know image processing techniques such as a technique of deriving the characteristic area by using a histogram of color components of the area and a technique of deriving a characteristic area by detecting edges.

It is possible to estimate from the shape of the characteristic area a rotation angle, a magnification and a reduction applied to image data of the copy inhibited matter.

According to the digital watermark techniques, embedded information is derived by checking integrity of the deriving conditions from the embedded position. Therefore, if the image with an embedded digital water mark is rotated, magnified or reduced, it is necessary to derive the digital watermark by using the geometrical conditions used when the digital watermark was embedded. Some digital watermark techniques have registration techniques for compensating for the above-described geometrical alteration.

If the digital watermark is embedded in the characteristic area as in this embodiment, it is possible to check any geometrical alteration added to the characteristic area. Therefore, a judgement of any geometrical alteration added to the characteristic area may help derive the digital watermark by recovering the original geometrical state of the characteristic area with the digital watermark.

Even if the digital watermark technique without the registration technique for correcting the geometrical alteration is used and any geometrical alteration is added to the image, the digital watermark information can be derived because the digital watermark information is embedded in the characteristic area as in this embodiment.

Figure 2:
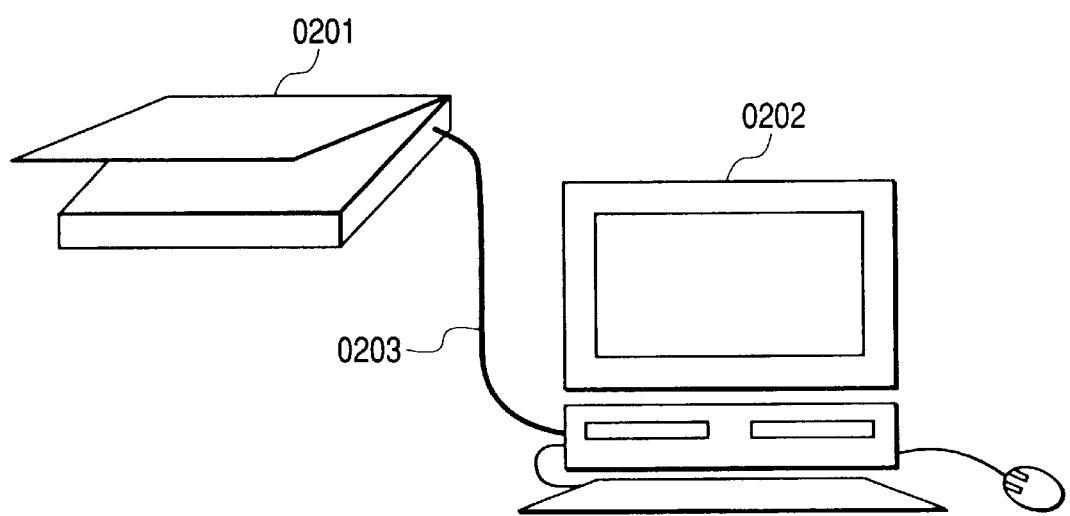
FIG. 2 is a diagram showing an example of an image processing system according to a first embodiment of the invention.

FIG. 2 is a diagram showing an image processing system for judging a copy inhibited matter according to the first embodiment of the invention. In FIG. 2, reference numeral 0201 represents a color image scanner as an image input apparatus, reference numeral 0202 represents a personal computer as a computer system, and reference numeral 0203 represents a connection cable for data transfer between the color image scanner 0201 and computer system 0202.

Figure 3:
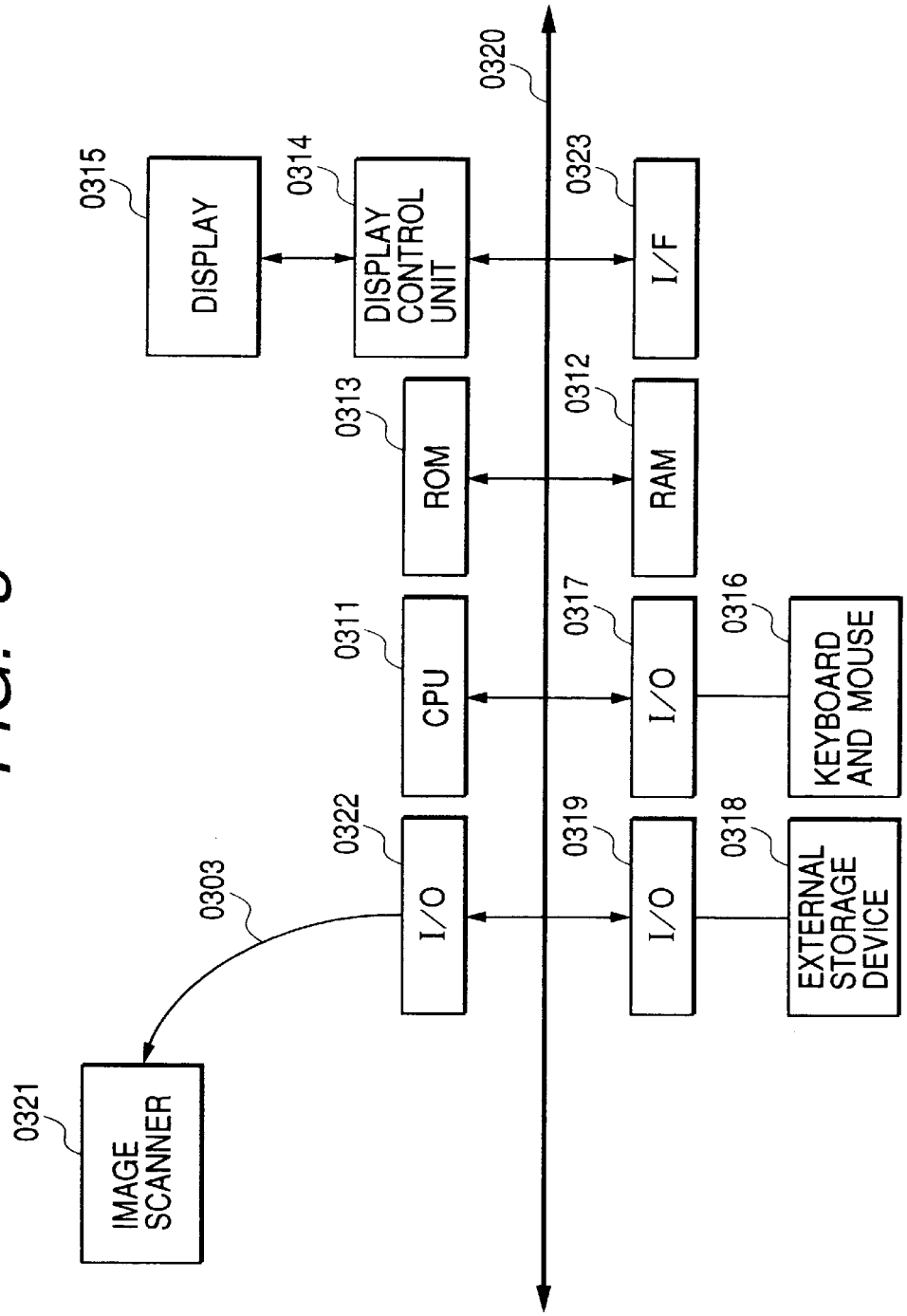
FIG. 3 is a block diagram showing the structure of a main portion of the system shown in FIG. 2.

FIG. 3 is a block diagram showing the main portion of the system shown in FIG. 2 in the form of function modules. In FIG. 3, the image processing system includes: a CPU 0311; a RAM 0312; a ROM 0313; a display control unit 0314; a display 0315; an input device 0316 such as a keyboard and a mouse; an I/O unit 0317 for the input device including the keyboard and mouse; an external storage device 0318 such as a hard disc drive; an I/O unit 0319 for the external storage device; a bus 0320; a color image scanner 0321; and an I/O unit 0322 for an image input apparatus such as a color image scanner. Reference numeral 0323 represents an interface to a communication line such as a network.

In the image processing system of the first embodiment, as an image is input from a color image scanner, it is judged whether the image is a copy inhibited matter. If it is judged as a copy inhibited matter, the image input is stopped, whereas if not, the image input continues.

Figure 5:
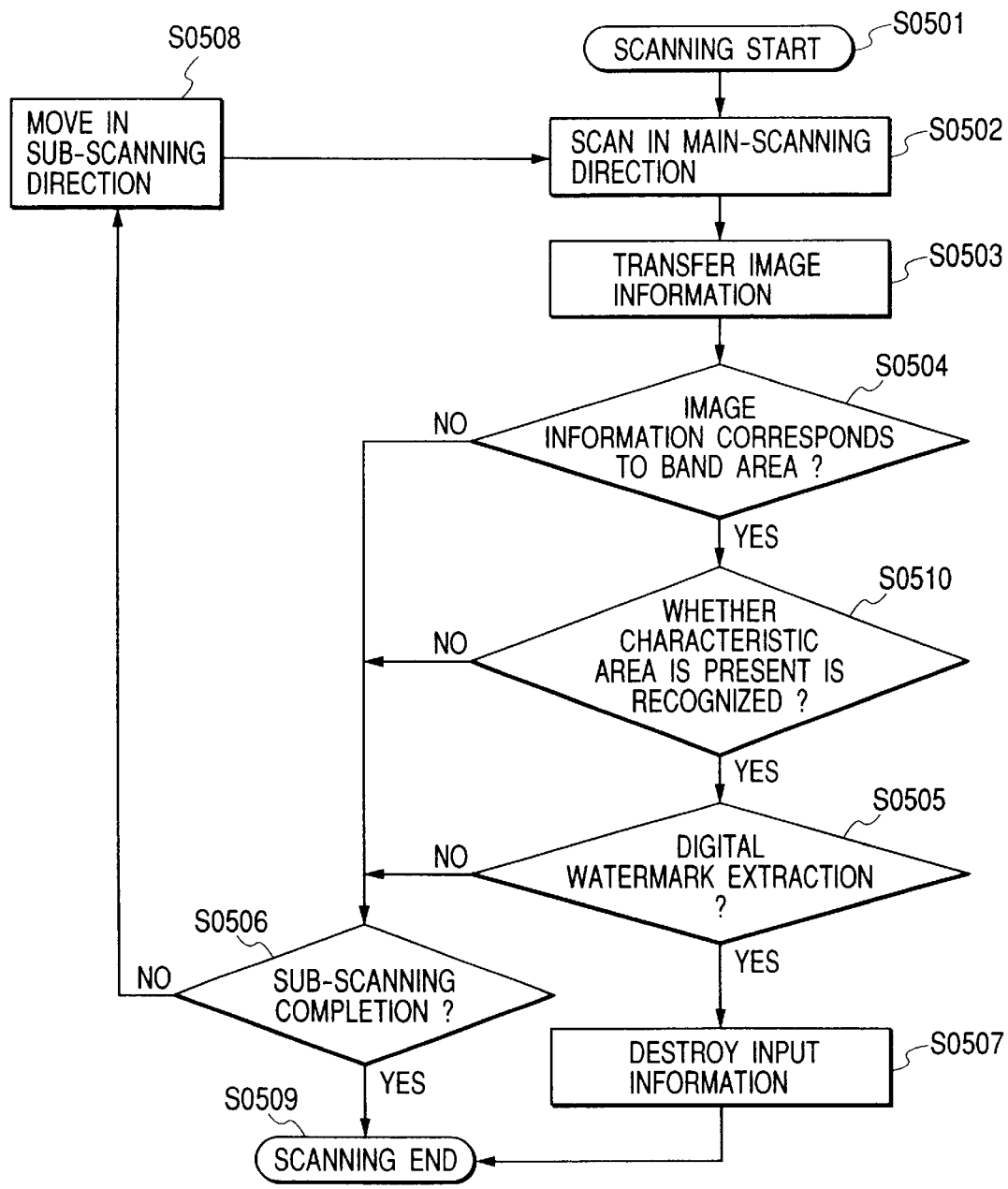
FIG. 5 is a flow chart illustrating the operation of the system of the first embodiment.

FIG. 5 is a flow chart illustrating the operation of a process of this embodiment to be executed by the system having the structure shown in FIGS. 2 and 3. A computer executable program (software) realizing the process shown in the flow chart of FIG. 5 stored beforehand in ROM 0313 or such a program stored in the external storage device 0319 and read to RAM 0312, is executed by CPU 0311 to perform the following process. This program functions as a scanner driver.

First, how the image scanner 0321 picks up an image will be described. A flat bed scanner most generally used in consumer markets is used as an example of the image scanner 0321. Scanners of other types may also be used in this embodiment as will be later clarified.

Figure 4:
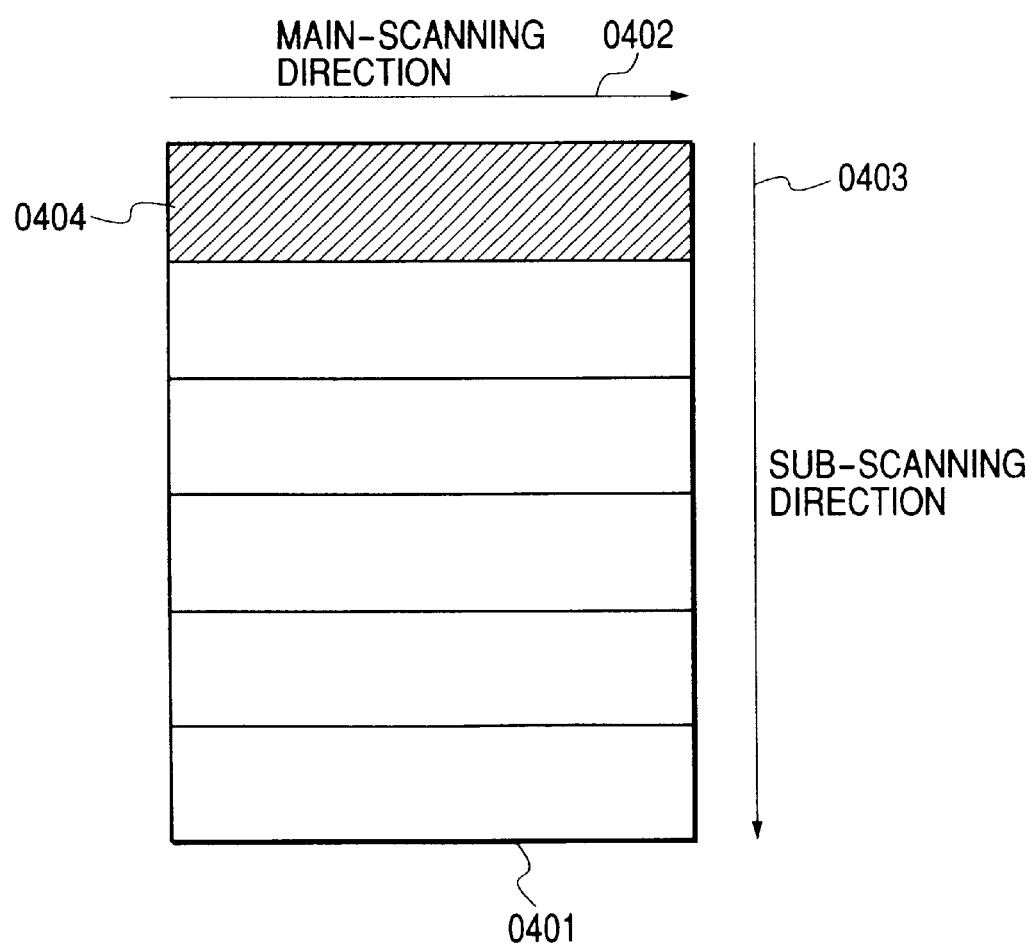
FIG. 4 is a diagram illustrating an image pickup operation of an image scanner.

An original is placed on an original support 0401 of the image scanner shown in FIG. 4. One row in the main-scanning direction 0402 of the original is illuminated with a light source in the image scanner. Light reflected from the original is input to a CCD sensor via a mirror and a lens of the scanner. The CCD sensor converts the input light intensity into numerical data to complete data read of one main-scanning line. Thereafter, the mirror and light source are moved slightly along the sub-scanning direction 0403 to repeat similar scanning. This data read in the lateral direction of the original (in the main-scanning direction 0402) is repeated as many times as the number of rows in the vertical direction to thereby read data of the whole original.

In the first embodiment, the image scanner 0321 repeats the above-described scanning operation and image data is stored in RAM 0312 via the I/O unit 0322. In the computer 0202, CPU 0313 runs the above-described program to derive digital watermark information each time image data in a band area 0404 is stored in RAM 0312. The band area 0404 has a predetermined length in the CCD sensor moving direction (main-scanning direction) and a predetermined width in the moving direction of the light source and mirror (sub-scanning direction).

The band area will be further detailed. As shown in FIG. 4, a scan object 0401 is divided into a plurality of band areas as shown in FIG. 4. A judgement for a copy inhibited mater is not performed after the whole scan object placed on the original support is scanned, but it is performed for each band area of the whole scan object.

The flow chart shown in FIG. 5 illustrates a series of such operations. As scanning starts, the image scanner scans along the main-scanning direction at Step 0502. Thereafter or during this scanning, image data is stored in RAM 0312 via the I/O unit 0322 at Step 0503. At Step 0504 it is checked whether image data corresponding to a band area is stored in RAM 0312.

If it is judged at Step 0504 that image data corresponding to the band area has been stored, the flow advances to Step 0510, whereas if not, the flow advances to Step 0506.

At Step 0510 it is checked whether the band area contains the characteristic area such as shown in FIG. 12 in which the digital watermark information was embedded. This Step 0501 is a characteristic area recognition step. As described earlier, a judgement whether the characteristic area exists can be made relatively easily by using well-known image processing techniques.

If it is judged at Step 0510 that the characteristic area exists in the band area, the flow advances to Step 0505 whereat a digital watermark is derived from the image data in the characteristic area. This Step 0505 is a digital watermark information deriving step.

If it is judged at Step 0510 that the characteristic area does not exist in the band area, the flow advances to Step 0506.

At Step 0506 it is judged whether a next sub-scanning operation is necessary (whether all the sub-scanning operations have been completed).

If it is judged at Step 0506 that a next sub-scanning operation is not necessary, the flow advances to Step 0509 whereat the scanning operation is terminated. If a next sub-scanning is necessary, the flow advances to Step 0508 whereat the necessary components are moved in the sub-scanning direction to thereafter return to Step 0502.

If the digital watermark deriving process at Step 0505 derives the digital watermark information representative of a copy inhibited matter, the flow advances to Step 0507 whereat the image data already stored in RAM 0312 is discarded at once to terminate the scanning.

If the digital watermark deriving process at Step 0505 judges that the image data does not indicate a copy inhibited matter, the flow advances to Step 0506. After the scanning of the original is completed, the scanning operation is terminated at Step 0509.

If it is judged at Step 0506 that the original is not still scanned completely, at Step 0508 the light source is moved along the sub-scanning direction to thereafter return to Step 0502.

With a series of the above-described operations, while an image is input with the color image scanner, it is possible to judge whether the image is a copy inhibited matter image. If the image is a copy inhibited matter image, the process is immediately terminated.

Next, the characteristic area recognizing process at Step 0510 and the digital watermark deriving process at Step 0505 will be detailed.

Figure 6:
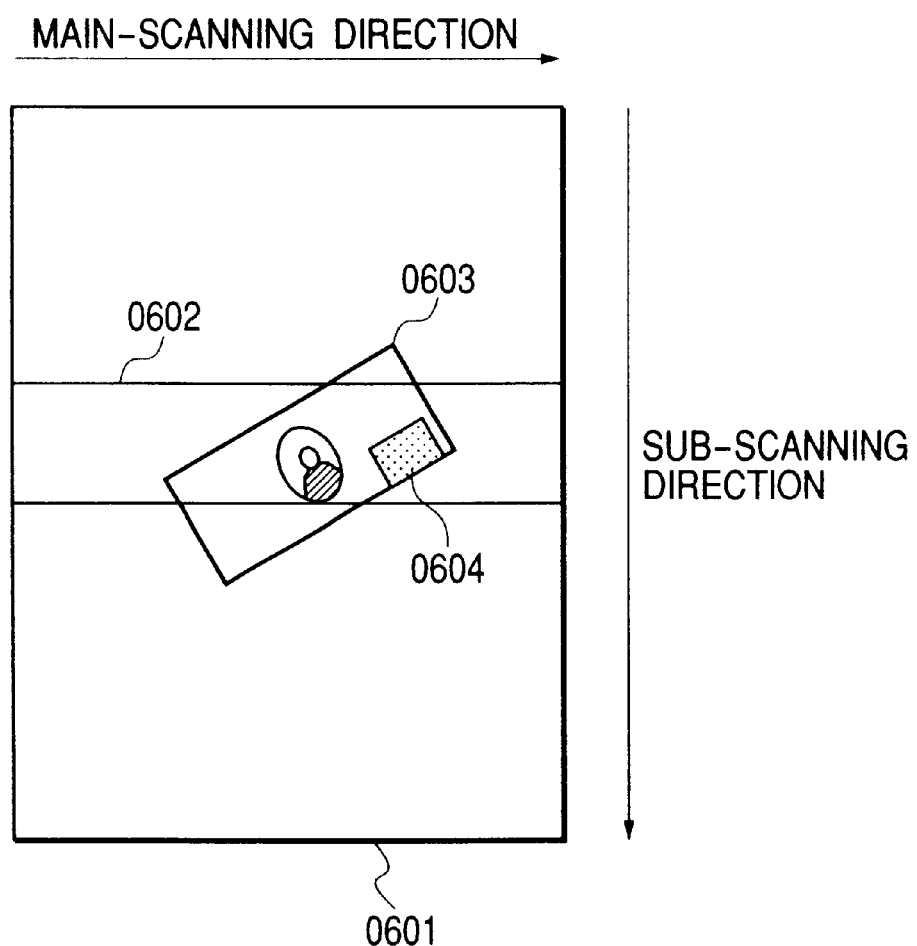
FIG. 6 is a diagram illustrating a detection of a copy inhibited matter according to the first embodiment.

FIG. 6 is a diagram showing the state that a copy inhibited matter 0603 is placed on the original support 0601 of the image scanner which reads image data of the copy inhibited matter 0603. Information representative of copy inhibition is being embedded in the characteristic area 0604 in the copy inhibited matter 0603 by using digital watermark techniques. A judgement whether the original is a copy inhibited matter 0602 is made in a band area 0602. Each time image data corresponding in amount to the band area is stored in RAM 0312 shown in FIG. 3, CPU 0311 judges whether there is a characteristic area in the image data of the band area.

In this embodiment, digital watermark information is embedded beforehand in the characteristic area 0604 of the copy inhibited matter. Therefore, it is not necessary to derive the digital watermark information from an area other than the characteristic area, and the time taken to recognize a copy inhibited matter can be shortened greatly.

Figure 13:
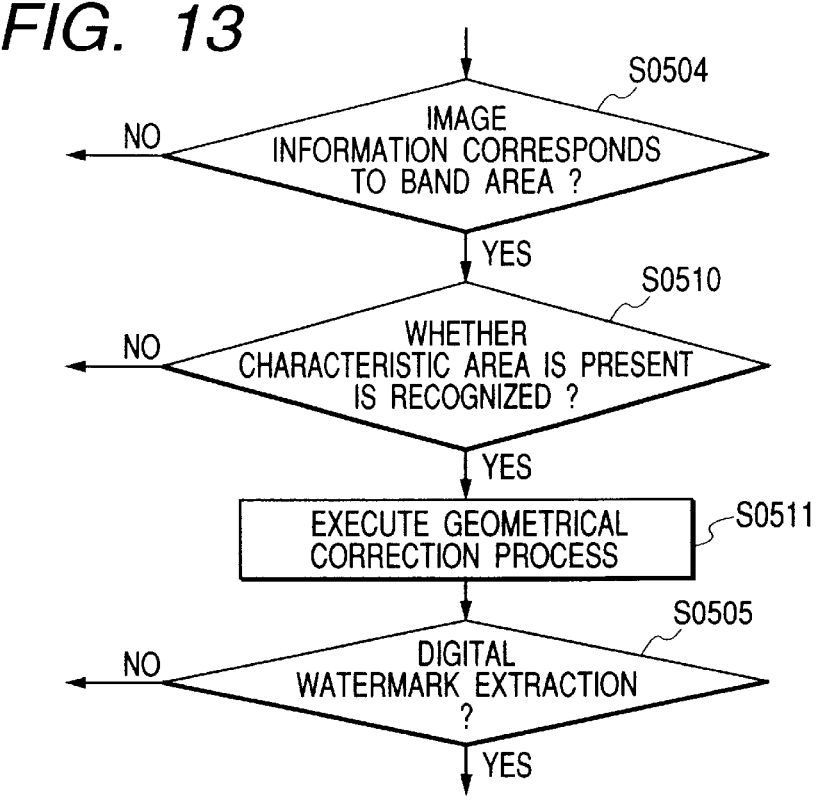
FIG. 13 is a flow chart illustrating a geometrical correction process added to the flow chart shown in FIG. 5.

Also in this embodiment, as shown in FIG. 13, a characteristic area geometrical correcting process at Step 0511 may be inserted between the process at Step 0510 of recognizing a characteristic area in a copy inhibited matter and the digital watermark information deriving process at Step 0505 shown in FIG. 5. After it is judged at Step 0510 that the copy inhibited matter contains the characteristic area, it is judged at Step 0511 whether there is any rotation, magnification or reduction applied to the characteristic area and the original geometrical state of the characteristic area with the digital watermark is recovered to help execute the digital watermark information deriving process at Step 0505.

With this characteristic area geometrical correction process at Step 0511, even if the copy inhibited matter 0603 is placed on the original support by rotating it, there is a high possibility that information on whether the image data is a copy inhibited matter can be derived precisely.

As described above, in the first embodiment, the digital watermark deriving process is not performed for the whole area of an original, but it is limited only to a characteristic area. Therefore, a process time can be shortened considerably as compared to the very long time of a conventional digital watermark deriving process.

Further, a judgement whether the image data corresponds to a copy inhibited matter is made by both the characteristic area recognizing process and digital watermark deriving process. It is therefore possible to lower the possibility that a matter other than a copy inhibited matter is erroneously judged as a copy inhibited matter.

In the above embodiment, one characteristic area is used per one copy inhibited matter. If a plurality of characteristic areas are used per one copy inhibited matter, a judgement can be made at high speed by performing the digital watermark deriving process for the first read characteristic area.

If the characteristic area is formed, for example, near at four corners of a copy inhibited matter, a characteristic area can be recognized at a relatively earlier stage of the original read, independently from the direction of the copy inhibited matter on the original support, and the judgement can be made at higher speed.

If the characteristic area is formed on both the front and bottom planes of a copy inhibited matter, either side of the matter can be inhibited to be copied.

Second Embodiment

In the first embodiment, a judgement whether image data read with a color image scanner corresponds to a copy inhibited matter is made by using digital watermark techniques.

Image data of a copy inhibited matter is not limited only to the color image data read with a color image scanner. For example, image data may be supplied from a communication line such as a network via the interface-unit 0323 shown in FIG. 3, or color image data may be supplied from a removable storage medium (e.g., SmartMedia memory, compact flash memory, magneto optical disc) inserted into an unrepresented drive connected to the image processing system. In this case, the copy inhibited matter characteristic area recognizing program is included in a network program (such as an Internet browser software) and a program for reading image data from the storage medium.

Figure 7:
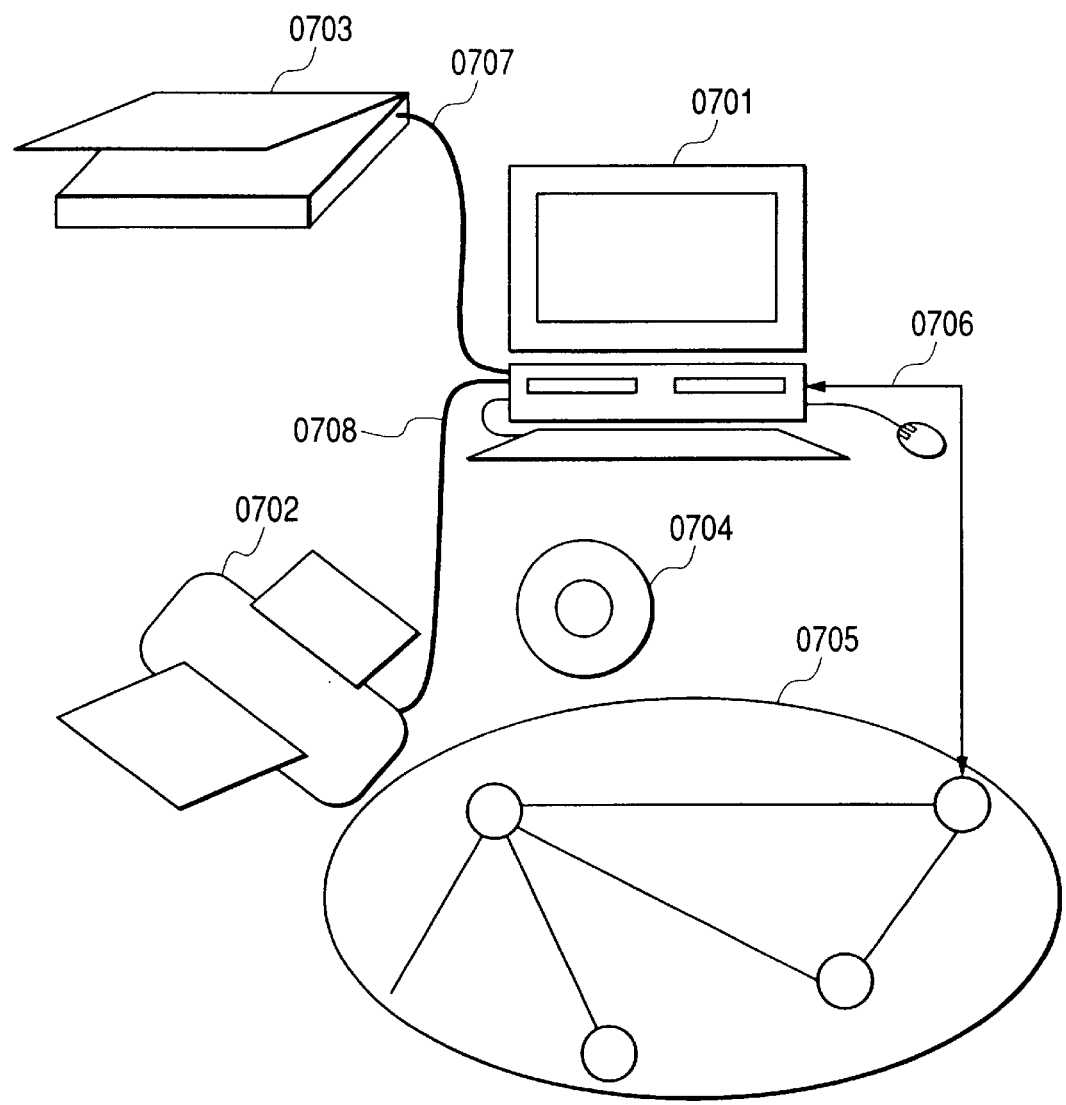
FIG. 7 is a diagram showing an example of an image processing system according to a second embodiment of the invention.

FIG. 7 is a diagram showing an image processing system for judging a copy inhibited matter according to the second embodiment of the invention. In FIG. 7, reference numeral 0703 represents a color image scanner as an image input apparatus, reference numeral 0701 represents a personal computer as a computer system, reference numeral 0707 represents a connection cable for data transfer between the color image scanner 0703 and computer system 0701, reference numeral 0702 represents a color printer as an image output apparatus, reference numeral 0708 represents a connection cable for data transfer between the color printer 0702 and computer system 0701, reference numeral 0704 represents an external storage medium, typically a CD-ROM, reference numeral 0705 represents a network, typically the Internet, and reference numeral 0706 represents a connection cable for data transfer between the computer system and a LAN or the Internet.

Figure 8:
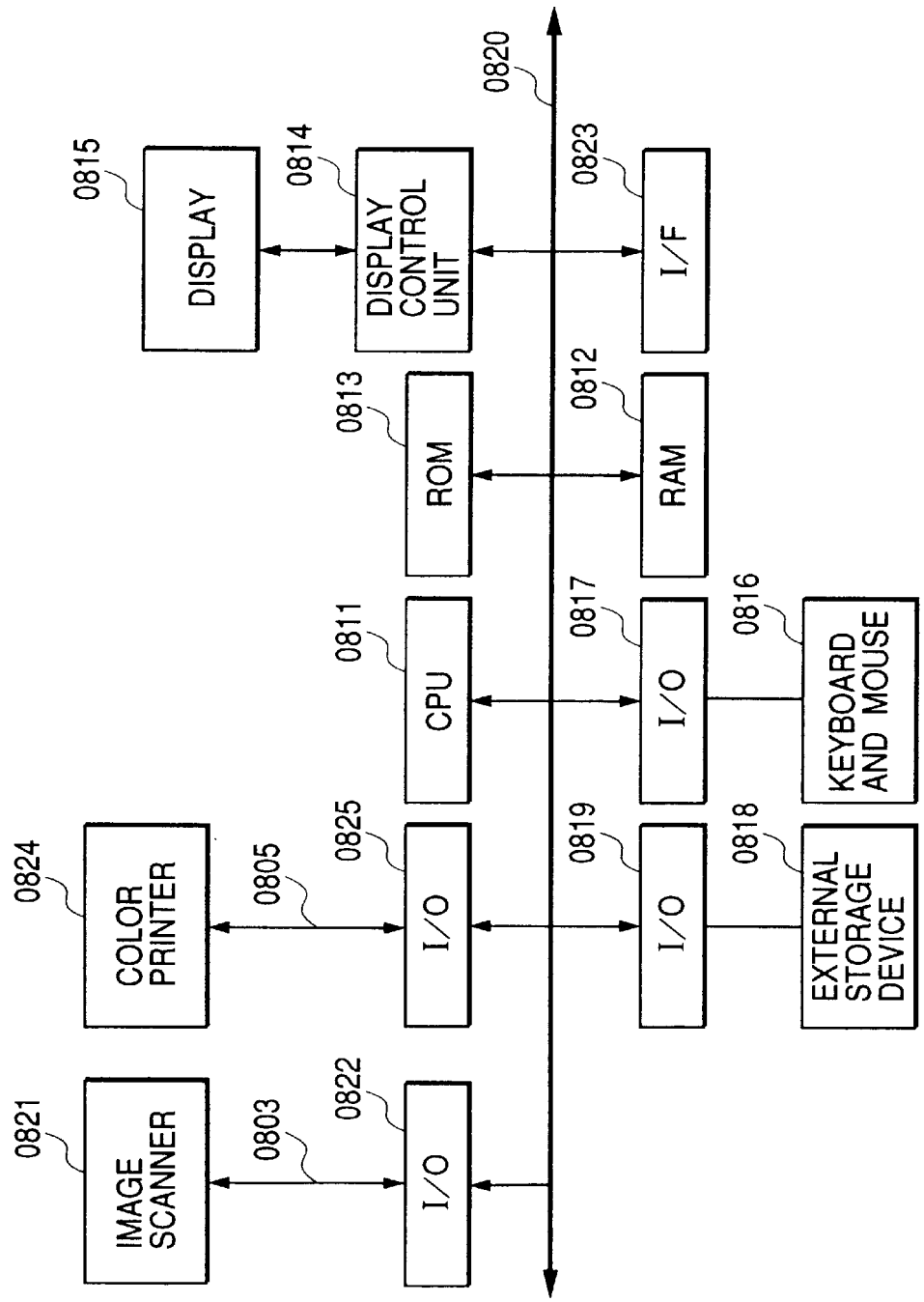
FIG. 8 is a block diagram showing the main portion of the system shown in FIG. 7.

FIG. 8 is a block diagram showing the main portion of the system shown in FIG. 7 in the form of function modules. In FIG. 8, the image processing system includes: a CPU 0811; a RAM 0812; a ROM 0813; a display control unit 0814; a display 0815; an input device 0816 such as a keyboard and a mouse; an I/O unit 0817 for the input device including the keyboard and mouse; an external storage device 0818 such as a hard disc drive; an I/O unit 0819 for the external storage device; a bus 0820, a color image scanner 0821; an I/O unit 0822 for an image input apparatus such as a color image scanner; a color printer 0824; and an I/O unit 0825 for the image output apparatus such as a color printer. Reference numeral 0823 represents an interface to a communication line such as a network.

In the image processing system of the second embodiment, as an image already digitalized is input from an external storage medium or a network, it is judged whether the image is a copy inhibited matter image, before the image is printed out by a color printer. If it is judged as a copy inhibited matter, the print-out is stopped, whereas if not, the print-out continues. In this embodiment, a printer driver includes a copy inhibited matter judgement program.

Figure 9:
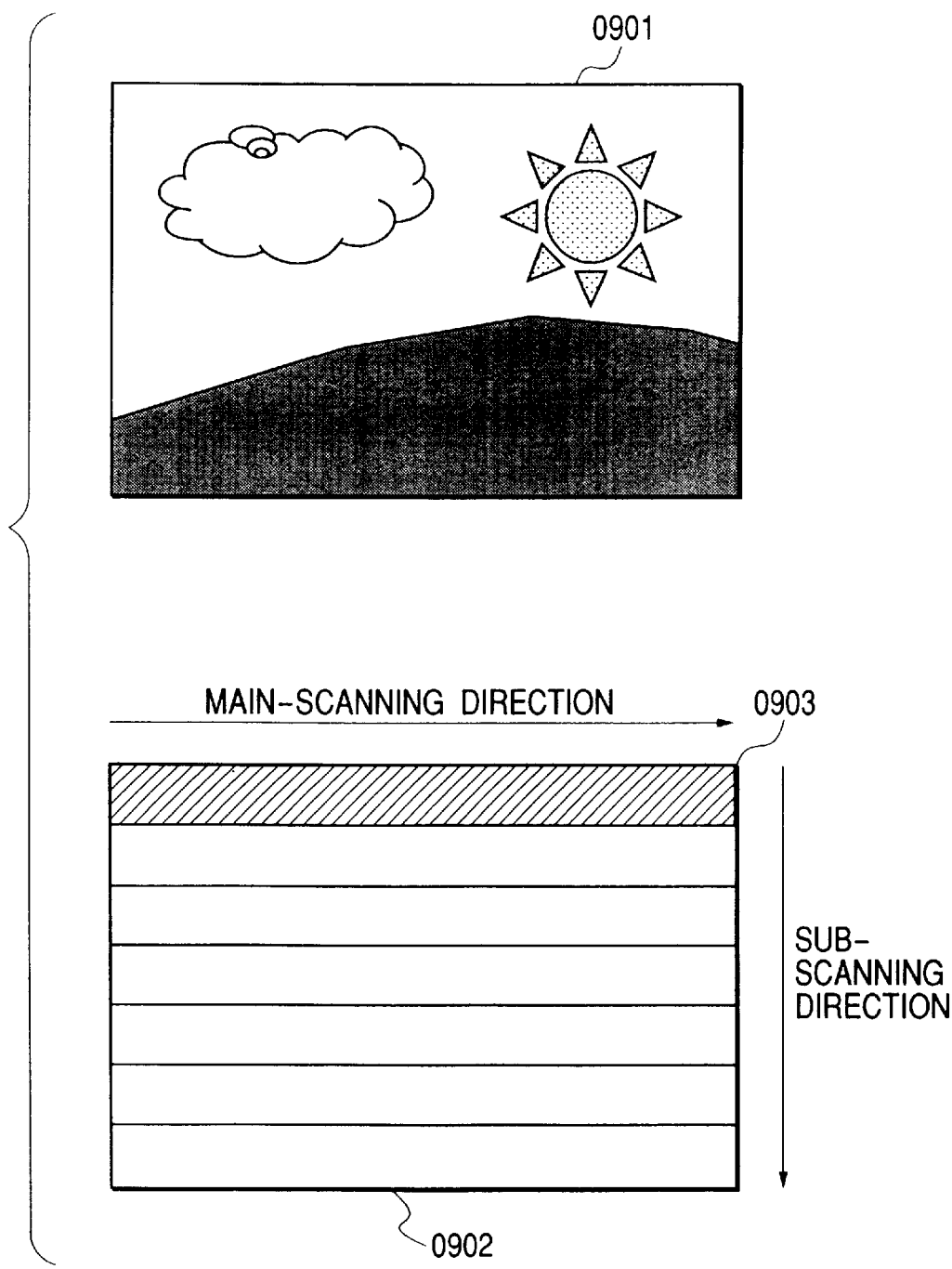
FIG. 9 is a diagram illustrating image processing by a printer driver.
Figure 11:
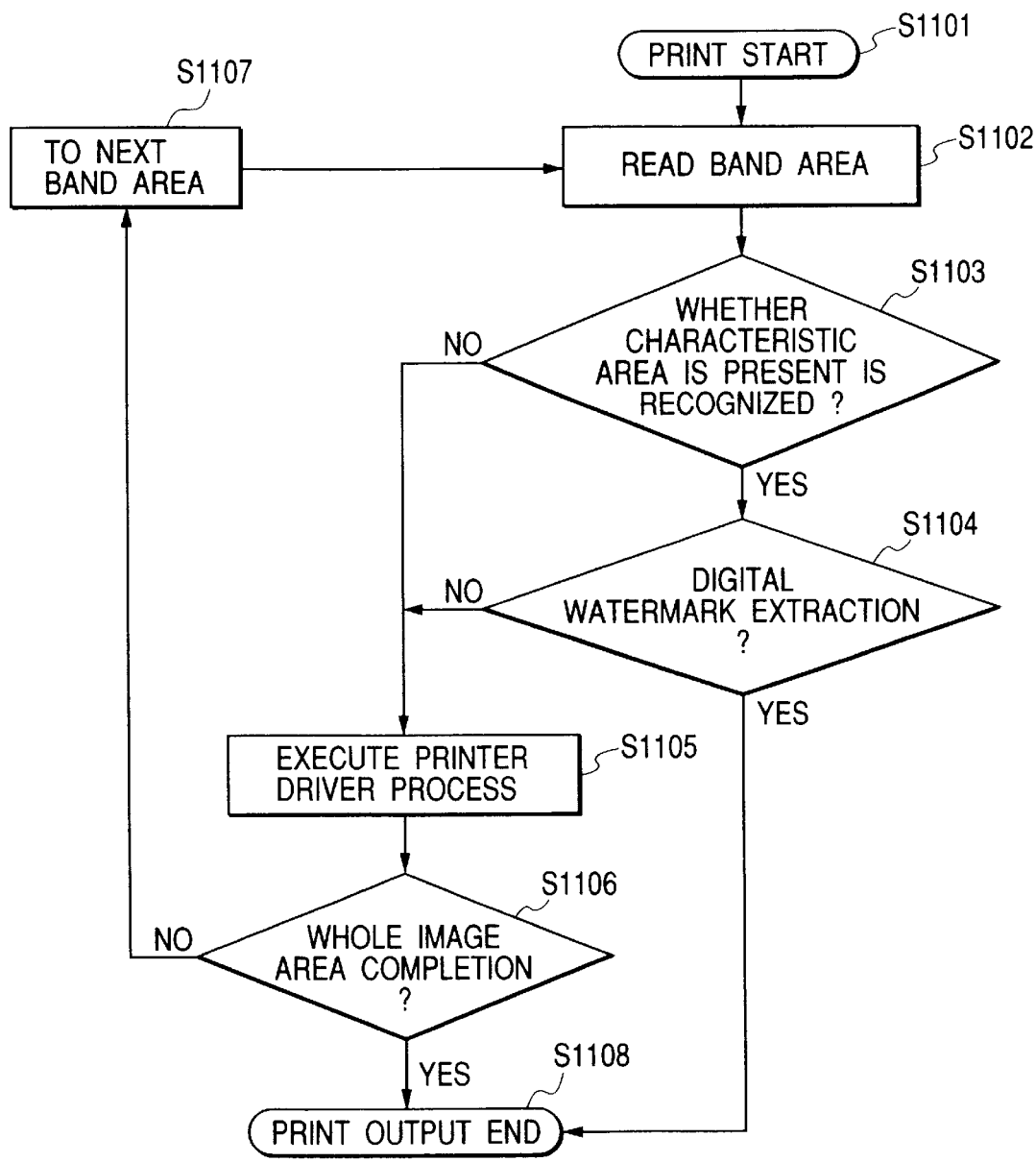
FIG. 11 is a flow chart illustrating the operation of the system of the second embodiment.

FIG. 11 is a flow chart illustrating the operation of a process of the second embodiment to be executed by the system having the structure shown in FIGS. 8 and 9. A computer executable program realizing the process shown in the flow chart of FIG. 11 stored beforehand in ROM 0813 or such a program stored in the external storage device 0819 and read to RAM 0812, is executed by CPU 0811 to perform the process of the second embodiment.

First, the image processing operation by a printer driver will be described. With this operation, image data input to the computer system 0701 from the color image scanner 0703, network 0705 or external storage medium 0704 is output from the color printer 0702 as the image output apparatus.

A pixel with gradation information of color digital image data is generally constituted of a plurality of color components. For example, color data of RGB 24-bit has eight bits for each of red, green and blue (256 tonal levels). Therefore, one pixel can show 24-bit colors (about 16.7 million colors).

A printer (in this embodiment, an ink jet printer most common mainly in consumer markets) forms an image by using ink of four colors CMYK (cyan, magenta, yellow and black, or other ink of light cyan, light magenta, light yellow and light black). An output of each ink dot is either ON or OFF so that it is difficult for each ink dot to have a tonal level. From this reason, gradation of each pixel is given in terms of the area by changing the quantity/number of ink dots output in a unit area. It is therefore necessary to use a binarizing process (half-tone process) for color separation of a color image into CMYK and conversion from density gradation into area gradation.

The color quality on a color reproduction area of a monitor is different from that on a recording sheet of a printer. It is therefore required that the printer driver performs color space compression (color matching) so as to obtain an image suitable for human eyes.

Such image processing for print-out is executed by CPU 0811 after image data in the external storage medium 0818 or ROM 0813 is developed on RAM 0812. This image processing generates printer control data which is supplied to the color printer 0824 via the I/O unit 0825. A series of such operations is executed by the printer driver. The printer driver is a program stored beforehand in ROM 0813 or external storage medium 0819. After the program is read to RAM 0812, it is executed by CPU 0811.

The process by the printer driver will be briefly described with reference to FIG. 9. The printer driver does not print out an image 0901 by developing the whole image 0901 on RAM 0812, but the printer driver has a process unit corresponding to a band area 0903 having a length along the printer head motion direction (main-scanning direction) and a width along a paper feed direction (sub-scanning direction) indicated by hatched lines in FIG. 9.

If information on the line before the current line is required for an error diffusion method of a binarizing process (halftone process), a buffer area for storing error data is reserved.

The printer driver divides the image 0901 into a plurality of band areas, and image data in each band area is developed on RAM 0812. This image data is processed by CPU 0811 to print out the image 0901.

In this embodiment, a judgement whether image data corresponds to copy inhibited matter data is made for each band area by using digital watermark techniques, and in accordance with the judgement, the printer driver controls a print-out of the copy inhibited matter from the printer.

FIG. 11 is a flow chart illustrating a series of processes of the second embodiment. As the print starts at Step 1101, an image in the band area is read to RAM 0812 at Step 1102. At Step 1103 it is checked from the image data in the band area stored in RAM 0812 whether the characteristic area exists in the copy inhibited matter. This Step 1103 is a characteristic area recognition process. If it is judged at Step 1103 that the characteristic area does not exist, the flow advances to Step 1105 whereat a usual printer driver process (a printer driver process without judging whether the image data corresponds to a copy inhibited matter) is executed. If it is judged at Step 1103 that the characteristic area exists, the flow advances to Step 1104.

At Step 1104 a digital watermark is derived from the characteristic area recognized at Step 1103. This Step 1104 is a digital watermark information deriving process. If the digital watermark deriving process at Step 1104 indicates that the image data corresponds to copy inhibited matter data, the flow advances to Step 1108 whereat the print-out is intercepted at once. Interception of the print-out may be a stop of the print-out or a stop of a normal print-out (without true print-out, such as paint-out and meshing). In this case, in order to notify an operator of the reason of interception of the print-out, a message such as "copy inhibited matter cannot be printed" is displayed.

If it is judged that the image data does not correspond to copy inhibited matter data, the flow advances to Step 1105 whereat a normal printer driver process is executed to thereafter advance to Step 1106. If it is judged the print-out of the whole image area is completed, the flow advances to Step 1108 whereat the print-out is stopped. If the print-out is not completed, the flow advances to Step 1107 to again process the next band area.

Next, the characteristic area recognizing process at Step 1110 and the digital watermark deriving process at Step 1105 will be detailed.

Figure 10:
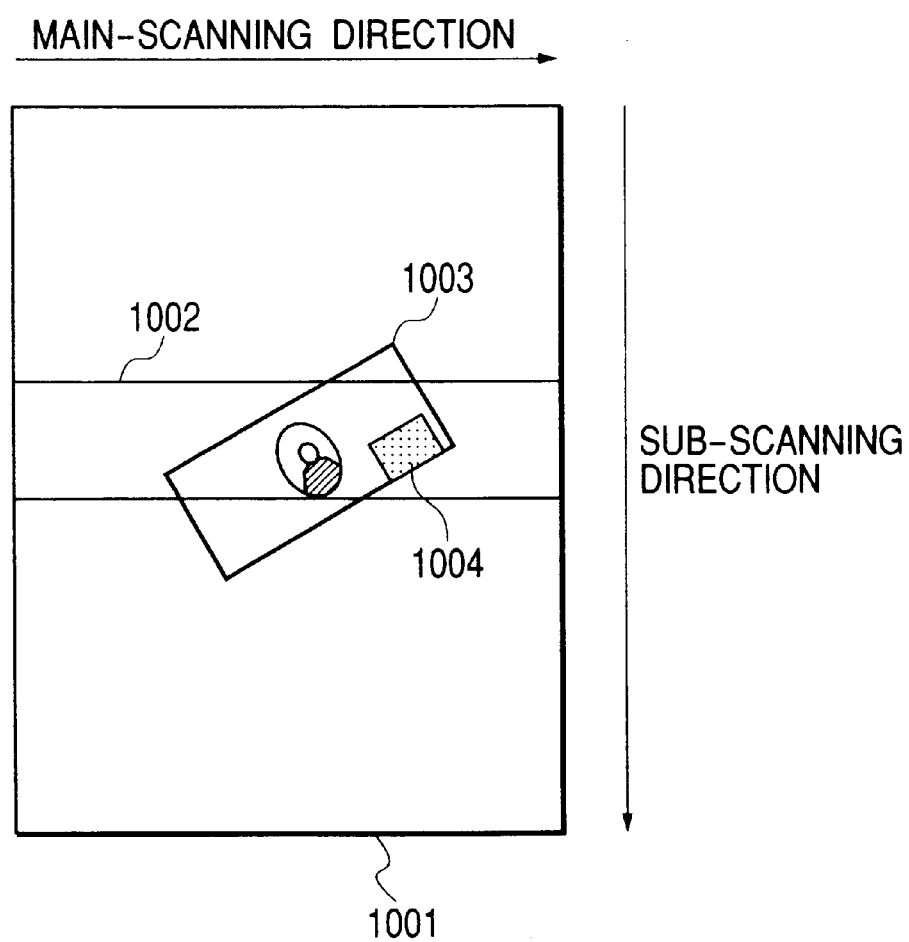
FIG. 10 is a diagram illustrating a detection of a copy inhibited matter according to the second embodiment.

FIG. 10 is a diagram showing the state that a copy inhibited matter 1003 is placed on the original support 1001 of the image scanner which reads image data of the copy inhibited matter 1003. Information representative of copy inhibition is being embedded in the characteristic area 1004 in the copy inhibited matter 1003 by using digital watermark techniques.

A judgement whether the original is a copy inhibited matter is made in a band area 1002. Each time image data corresponding in amount to the band area is stored in RAM 0812 shown in FIG. 8, CPU 0811 judges whether there is a characteristic area in the image data of the band area.

Also in the second embodiment, digital watermark information is embedded beforehand in the characteristic area of the copy inhibited matter. Therefore, it is not necessary to derive the digital watermark information from an area other than the characteristic area, and the time taken to recognize a copy inhibited matter can be shortened greatly.

Figure 14:
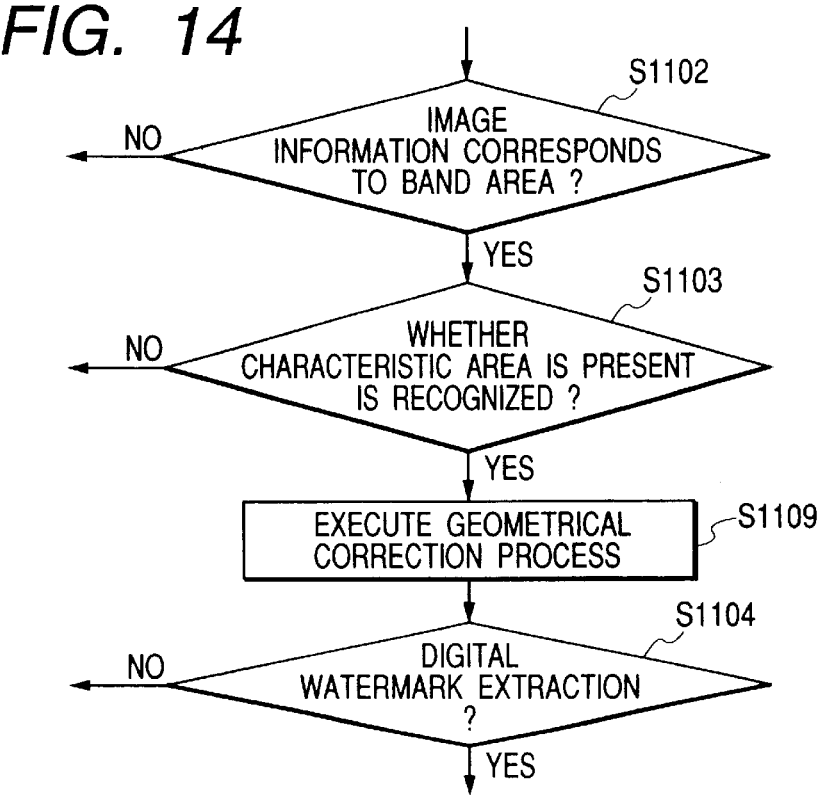
FIG. 14 is a flow chart illustrating a geometrical correction process added to the flow chart shown in FIG. 11.

Also in this embodiment, as shown in FIG. 14, a characteristic area geometrical correcting process at Step 1109 may be inserted between the process at Step 1103 of recognizing a characteristic area in a copy inhibited matter and the digital watermark information deriving process at Step 1104 shown in FIG. 11. After it is judged at Step 1103 that the copy inhibited matter contains the characteristic area, it is judged at Step 1109 whether there is any rotation, magnification or reduction applied to the characteristic area and the original geometrical state of the characteristic area with the digital watermark is recovered to help execute the digital watermark information deriving process at Step 1104.

With this characteristic area geometrical correction process at Step 1109, even if the copy inhibited matter 1003 is placed on the original support by rotating it, there is a high possibility that information on whether the image data is copy inhibited matter data can be derived precisely.

As described above, in the second embodiment, the digital watermark deriving process is not performed for the whole area of an original, but it is limited only to a characteristic area. Therefore, a process time can be shortened considerably as compared to the very long time of a conventional digital watermark deriving process.

Further, a judgement whether the image data corresponds to copy inhibited matter data is made by both the characteristic area recognizing process and digital watermark deriving process. It is therefore possible to lower the possibility that a matter other than a copy inhibited matter is erroneously judged as a copy inhibited matter. This is particularly suitable for the recognition process by a printer driver or the like whose print time is an important item of the product specification.

In the above embodiment, one characteristic area is used per one copy inhibited matter. If a plurality of characteristic areas are used per one copy inhibited matter, a judgement can be made at high speed by performing the digital watermark deriving process for the first read characteristic area.

If the characteristic area is formed, for example, near at four corners of a copy inhibited matter, a characteristic area can be recognized at a relatively earlier stage of the original read, independently from the direction of the copy inhibited matter on the original support, and the judgement can be made at higher speed. Even if any characteristic area cannot be recognized, there is a possibility that any one of the other characteristic areas can be recognized. The recognition precision can therefore be improved.

If the characteristic area is formed on both the front and bottom planes of a copy inhibited matter, either side of the matter can be inhibited to be copied.

According to the embodiments, a strict image recognition is possible even with a relatively small amount of calculations.

Since the digital watermark is derived from a recognized characteristic area, a time taken to perform the digital watermark deriving process can be shortened.

Since the image processing is executed after the characteristic area is recognized and the digital watermark is derived, the image processing can be controlled by using the results of both the characteristic area recognizing operation and digital watermark deriving operation.

If a plurality of characteristic areas are formed or four characteristic areas are formed near at four corners of a copy inhibited matter, recognition at higher speed and with higher precision can be realized.

Third Embodiment

Figure 15:
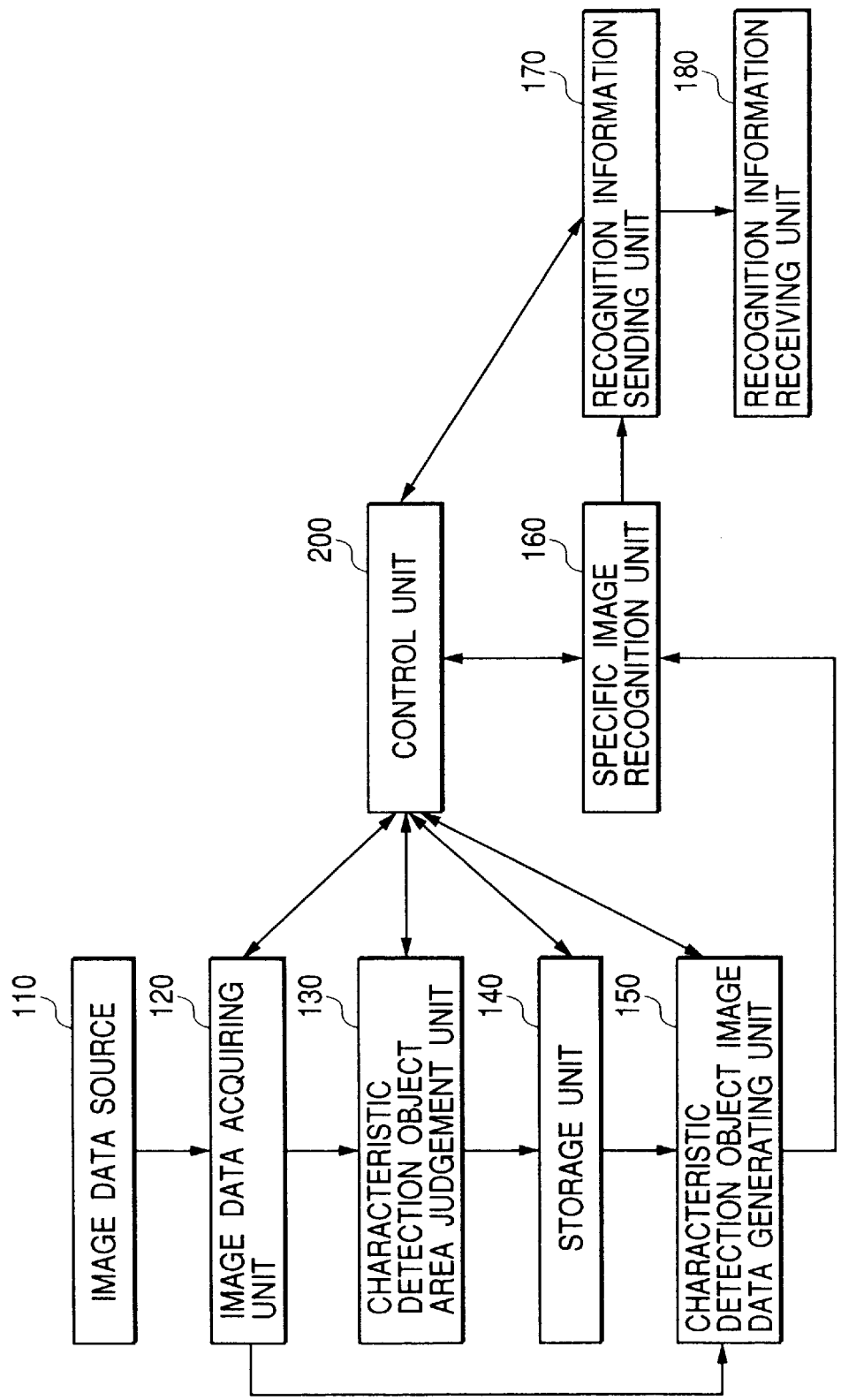
FIG. 15 is a diagram showing the structure of an image processing apparatus according to a third embodiment of the invention.

As shown in FIG. 15, an image processing apparatus of this embodiment includes: an image data acquiring unit 120 for acquiring image data from an image data source 110 typically a color image scanner or external storage medium; a characteristic detection object area judgement unit 130 for identifying a specific image characteristic detection object area in accordance with original position data in image data acquired by the image data acquiring unit 120; a characteristic detection object image data generating unit 150 for generating image data of the characteristic detection object area from the image data acquired by the image data acquiring unit 120, in accordance with the characteristic detection object area data obtained by the characteristic detection object area judging unit 130; a specific image recognition unit 160 for judging whether image data corresponds to a copy inhibited matter, in accordance with the characteristic detection object image data generated by the characteristic detection object image data generating unit 150; and a recognition information sending unit 170 for outputting recognition information. In FIG. 15, reference numeral 180 represents a recognition information receiving unit such as a display for receiving recognition information and displaying a message such as "an original is a copy inhibited matter" to an operator of an image processing system. Reference numeral 140 represents a storage medium such as a RAM for temporarily storing data, and reference numeral 200 represents a control unit for controlling the operation of the whole image processing apparatus.

Each functional block of the image processing apparatus constructed as above operates in the following manner. An operator of the image processing system manipulates an unrepresented operation unit of the system to input image data obtained from an original set at the image data source to the characteristic detection object area judgement unit 130 via the image data-acquiring unit 120. The characteristic detection object area judging unit 130 stores, in the storage unit, characteristic detection object image data in an area inclusive of four corners of a genuine original image, and notifies this effect to the control unit 200. The control unit 200 instructs again the image data acquiring unit 120 to acquire image data. This acquired image data is output to the characteristic detection object image data generating unit 150. In accordance with the data obtained by the characteristic detection object area judging unit 130, the characteristic detection object image data generating unit 150 generates the characteristic detection object image data from the second acquired image data supplied from the image data acquiring unit 110, and outputs the generated data to the specific image recognition unit 160. The specific image recognition unit 160 judges whether the image data output from the characteristic detection object image data generating unit 150 corresponds to copy inhibited matter data, and outputs the judgement result to the control unit 200. If the judgement result indicates a copy inhibited matter, this effect is notified to the recognition information receiving unit 180 via the recognition information sending unit 170 in order to make the operator of the image processing system know such an effect.

The third and following embodiments of the invention will be described assuming that information representative of a copy inhibited matter is embedded in an original by using techniques called "digital watermark". Namely, a printed matter is produced from image data (electronic image data) with copy inhibited matter information, the image data being generated by embedding second digital data representative of copy inhibited matter information in original first digital image data. The digital watermark may be any digital watermark such as an invisible digital water mark produced by embedding data in image data at a specific spatial frequency and a visible digital watermark produced by embedding data of yellow-based dots hard to recognized by human eyes in image data.

During a digital image data producing process of scanners, facsimile apparatus, and digital copy machines, it is very difficult to read an original at a correct position on the original support without any inclination or transfer. A produced image has often a large blank area. If this blank area is reduced, it is possible to considerably shorten the time taken to derive embedded digital watermark data from a produced image by using digital watermark techniques.

Figure 16:
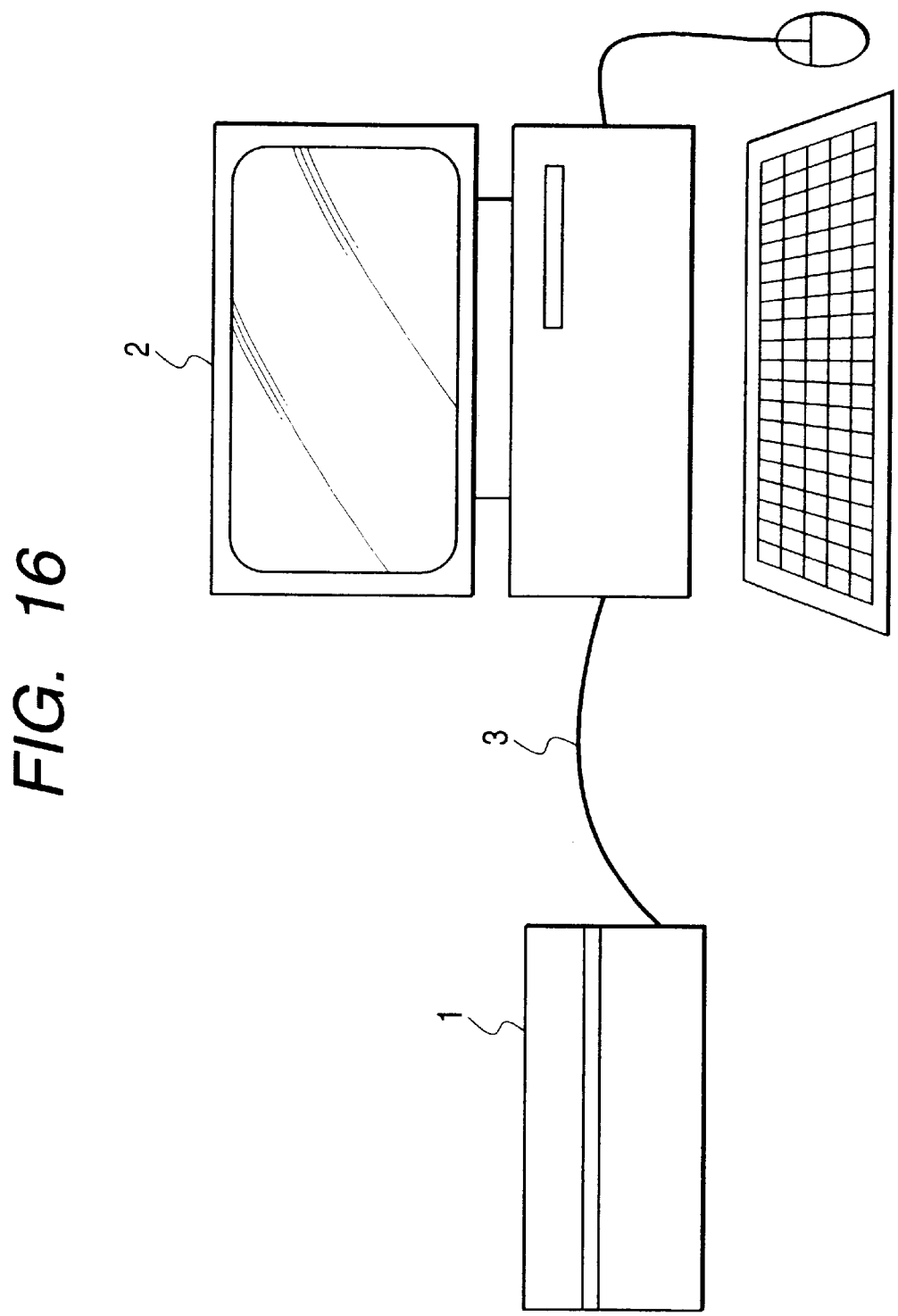
FIG. 16 is a diagram showing an example of an image processing system according to the third embodiment of the invention.

The third and following embodiments of this invention will be described with reference to the accompanying drawings. FIG. 16 is a diagram showing an image processing system according to the third embodiment of the invention. FIG. 16 is a diagram showing an example of an image processing system of the third embodiment. In FIG. 16, reference numeral 1 represents a color image scanner as an image input apparatus, reference numeral 2 represents a personal computer as a computer system, and reference numeral 3 represents a connection cable for data transfer between the color image scanner 1 and computer system 2.

Figure 17:
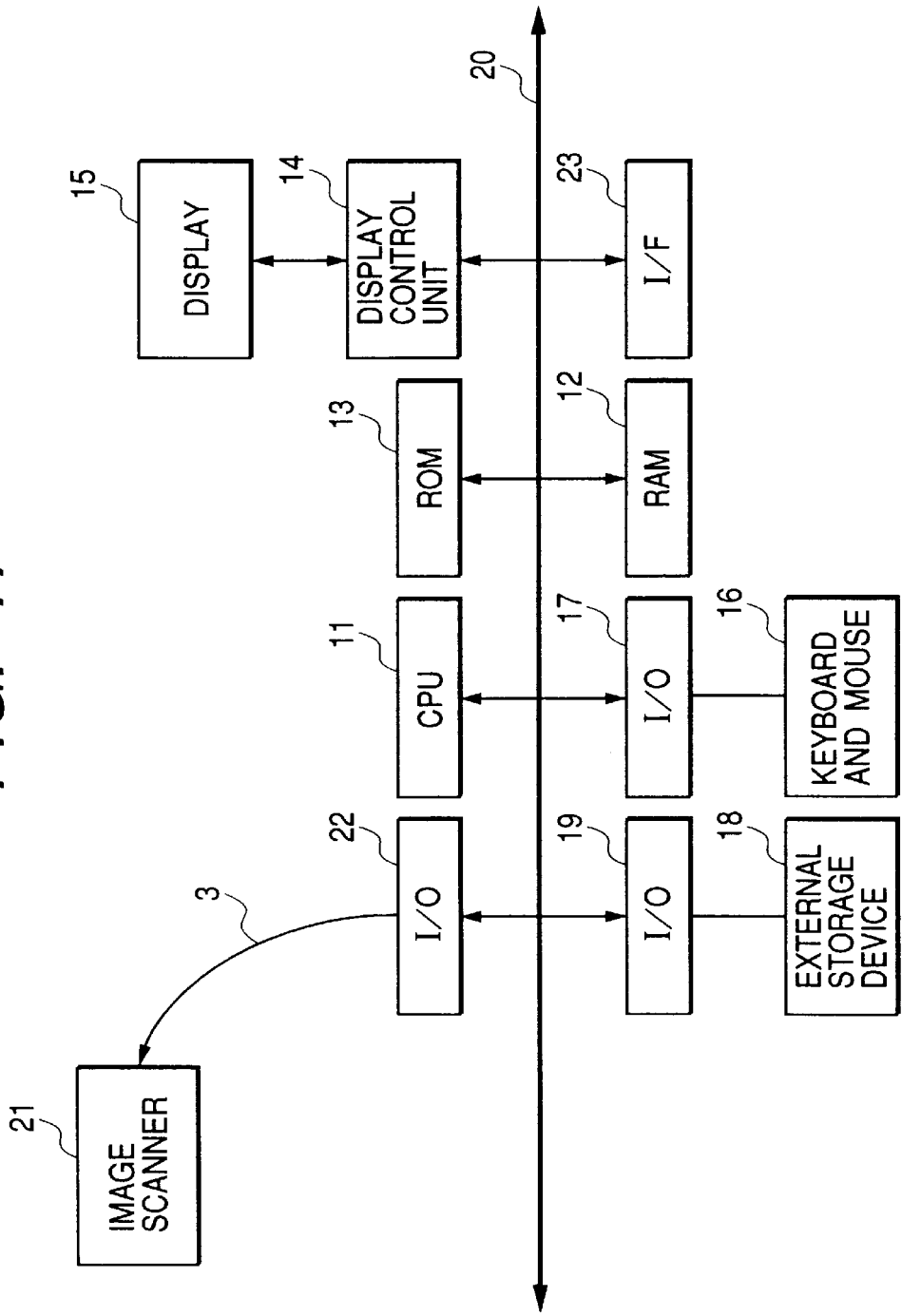
FIG. 17 is a block diagram showing the structure of a main portion of the system shown in FIG. 16.

FIG. 17 is a block diagram showing the main portion of the image processing system structured as shown in FIG. 16 in the form of functional modules. In FIG. 17, the image processing system includes: a CPU 11; a RAM 12; a ROM 13; a display control unit 14; a display 15; an input device 16 such as a keyboard and a mouse; an I/O unit 17 for the input device including the keyboard and mouse; an external storage device 18 such as a hard disc drive; an I/O unit 19 for the external storage device; a bus 20; a color image scanner 21; and an I/O unit 22 for an image input apparatus such as a color image scanner. Reference numeral 23 represents an interface to a communication line such as a network.

Figure 18:
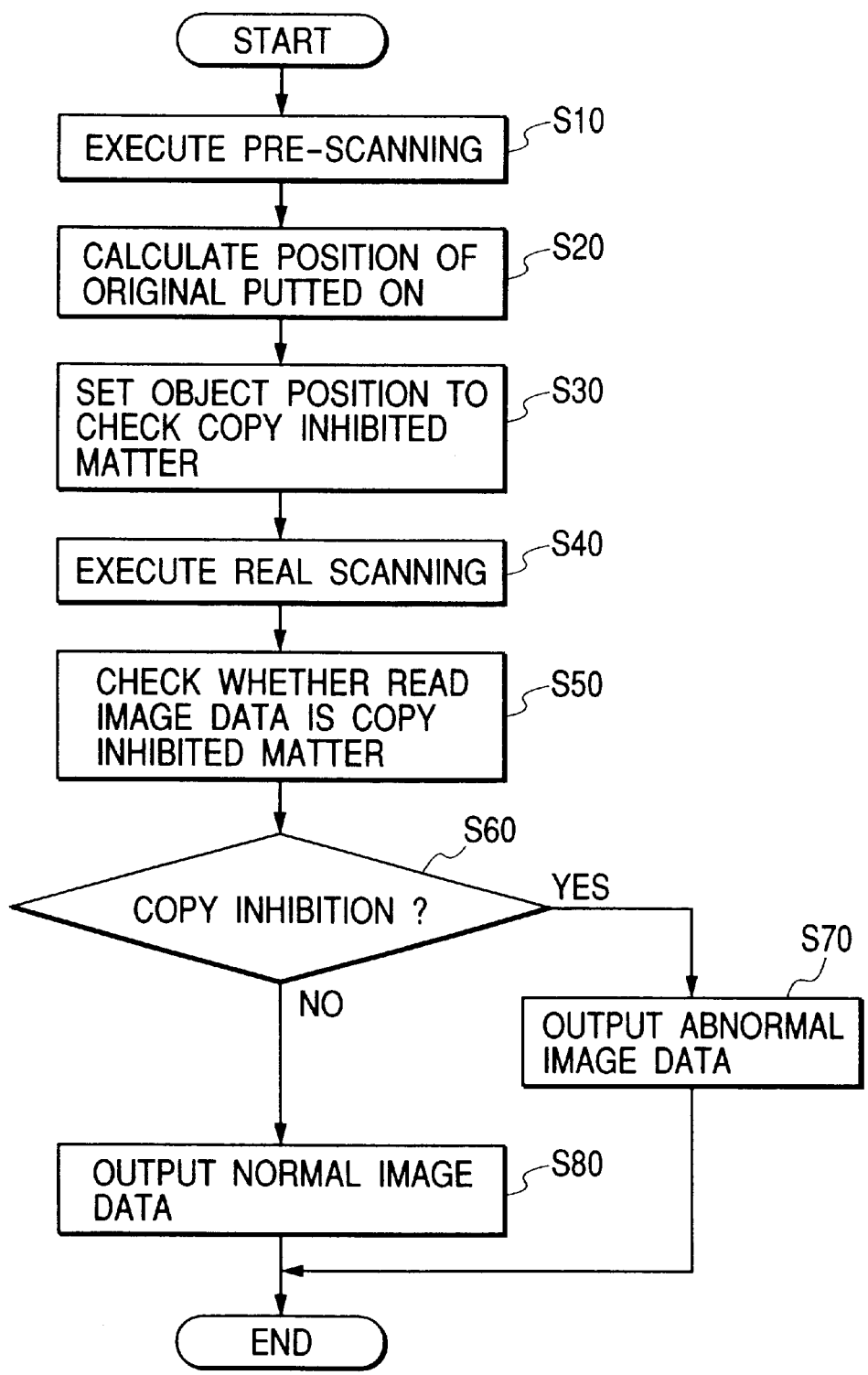
FIG. 18 is a flow chart illustrating the operation of the system and main portion shown in FIGS. 16 and 17.

FIG. 18 is a flow chart illustrating the operation of a process of this embodiment to be executed by the system having the structure shown in FIGS. 16 and 17. A computer executable program realizing the process shown in the flow chart of FIG. 18 stored beforehand in ROM 13 or such a program stored in the external storage device 19 and read to RAM 12, is executed by CPU 11 to perform the processes of this flow chart. This program functions as a scanner driver.

Referring to the flow chart shown in FIG. 18, as a series of processes starts, at Step S10 CPU 11 instructs the color image scanner 21 via the I/O unit 22 to read an original placed on an original support at a read density (e.g., 100 dpi [dots/inch]) coarser than the final read density (e.g., 400 dpi). The color image scanner 22 reads the original at a designated coarse density. Image data read at a coarse density is stored in RAM 12 via the I/O unit 22. Although the detailed description of reading an original at a coarse density is omitted, this operation is performed by using a well-known function provided by a color image scanner driver.

Next, at Step S20 the positions α of the original on the scanner platen are calculated from the image data read at a coarse density and stored in RAM 12 at Step S10 to thereafter advance to Step S30. At Step S30, in accordance with the positions a of the original on the scanner platen calculated at Step S20, in the example shown in FIG. 19 a read area S is determined which is a rectangle area having two sides in parallel to the main-scanning direction X and to the sub-scanning direction Y and including four corners A, B, C and D of the genuine original image on the four sides of the rectangle. Thereafter, the flow advances to Step S40.

At Step S40 CPU 11 instructs the color image scanner 21 via the I/O unit 22 to read the original placed on the original support at a final read density (e.g., 400 dpi) designated by the operator. The color image scanner 21 reads the original at the designated read density. The read image data is stored in RAM 12 via the I/O unit 22. After this Step S40, the flow advances to Step S50. In order to prevent a malicious operator from changing the original during the real scanning at the designated read density from the original during the pre-scanning, the image data during the pre-scanning is compared with the image data during the real scanning. Since it is not preferable to increase the process amount by this comparison, the comparison is performed only for one of the four points A, B, C and D shown in FIG. 19. If a similarity degree is low at one point, similarity degrees at the other three points are checked.

At Step S50 a characteristic area check (digital watermark check) is performed to determine whether the image data read at Step S40 indicates that the original is a copy inhibited matter, to thereafter advance to Step S60. At Step S60 it is judged from the characteristic area check result at Step S50 whether the image is a copy inhibited matter image. If it is judged that the image is a copy inhibited matter image, the flow advances to Step S70, whereas if not, the flow advances to Step S80.

At Step S70, image data different from normal image data is output. Namely, as described earlier, (1) the image data is output after it is painted out with some color, (2) the image data is output after some symbol or figure is superposed upon the image data, or (3) the image data is output out after its color or size is changed, or an abnormal (different from the read image data itself) image data obtained by a combination of (1) to (3) is output. Such abnormal image data can be easily generated by making CPU 11 execute a program module for performing well-known image processing of the read data in RAM 12. The generated abnormal image data is output to the external storage device 18 via the I/O unit 19 in the form of an image data file. After Step S70, a series of processes is terminated.

If it is judged that the image is not a copy inhibited matter image, then at Step S80 the image data read at Step S50 is output to the external storage device 18 via the I/O unit 19 in the form of an image data file. After Step S80, a series of processes is terminated.

Instead of outputting an image data file at Step S70, (4) the image data may not be output at all, or (5) attention or warning signals indicating that the original is a copy inhibited matter may be output to the display 15 via the display control unit 14.

The process at Step S20 for calculating the positions of an original on the original support is performed, for example, by using an angle detecting method. Namely, the position of an edge of an original at each scanning line is detected from a difference between a read pixel value of a platen cover of the scanner and a read pixel value of the original. By detecting the positions of four corners of the original from the original edge position data, the position of the original can be detected. The process at Step S50 for checking the characteristic area of a copy inhibited matter is performed in the following manner. The characteristic area is derived from the image data obtained by photoelectrically scanning an original in the form of a printed matter formed by using original image data with copy inhibited matter information generated by using digital watermark techniques.

After Step S60, the flow advances to Step S70 if it is judged at Step S50 that the image is a copy inhibited matter image, whereas it advances to Step S90 in the case of an opposite judgement at Step S50.

Figure 19:
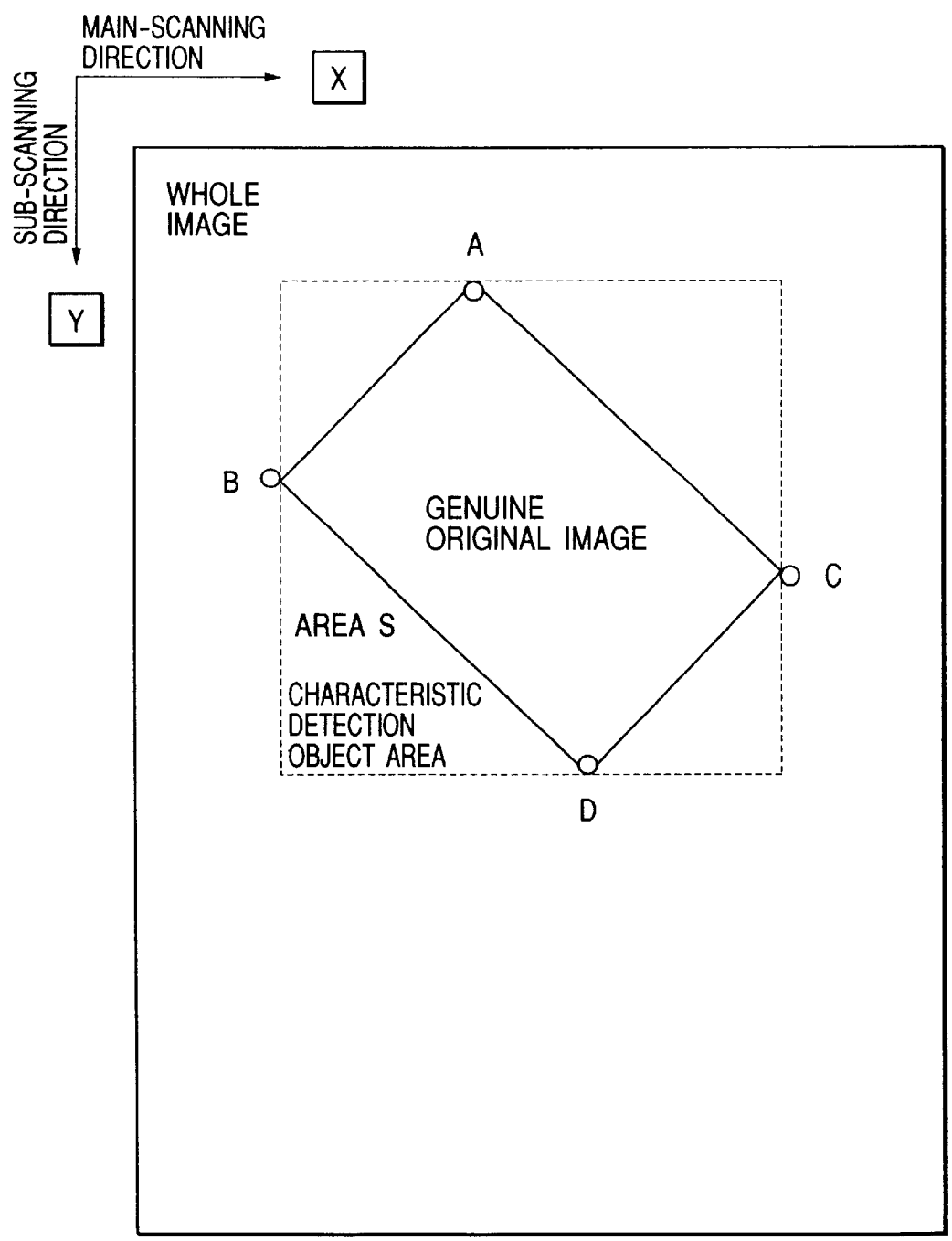
FIG. 19 is a diagram showing a characteristic detection object area in the whole image.

The read area S shown in FIG. 19 is not limited only to a rectangle, but any other shape may be used if it includes the four corners A, B, C and D. As described so far, the digital watermark deriving process for judging whether an original is a copy inhibited matter can be limited to the image data only in the read area for the original. The calculation amount required for a software judgement can therefore be reduced. In determining the read area for the original, data read at a coarse read density is used so that the read area can be determined at high speed. Since image data read at the density designated by an operator is used for the digital watermark deriving process, as different from the coarse read density used for determining the read area, the image data desired by the operator can be checked reliably.

Fourth Embodiment

In the third embodiment, the characteristic area of a copy inhibited matter is derived at Step S50 from the image data obtained by photoelectrically scanning an original in the form of a printed matter formed by using original image data with copy inhibited matter information generated by using digital watermark techniques. The invention is not limited only to this method.

In deriving the characteristic area of a copy inhibited matter at Step S50, as described earlier, a color spectrum distribution of pixel values (R, G and B pixel values of three-color signals) of image data obtained by scanning is compared with data stored in advance in ROM 13. This comparison is made by calculating a total sum of absolute values of differences or by calculating correlation values between distributions. Alternatively, a partial or whole image pattern of an original is compared with pattern data stored in advance in a ROM or the like to calculate an evaluation value.

In this case, at Step S60, the evaluation value obtained at Step S50 (such as a total sum of absolute values of differences and correlation values between distributions) is compared with a predetermined threshold value. For example, if the total sum of absolute values of differences does not exceed the threshold value, the original is assumed a copy inhibited matter, whereas if not, the original is not assumed a copy inhibited matter. Alternatively, if the correlation value exceeds the threshold value, the original is assumed a copy inhibited matter, whereas if not, it is not assumed a copy inhibited matter.

Fifth Embodiment

In the third and second embodiments, the rectangular read area including the four corners of an original is determined at Step S30 by the calculation of the position of the original at Step S20. The invention is not limited thereto. For example, in addition to calculating the position of an original at Step S20, a variably magnification process or shift process may be performed for a genuine original image data obtained by reading an original placed obliquely on the original support (platen).

Figure 20:
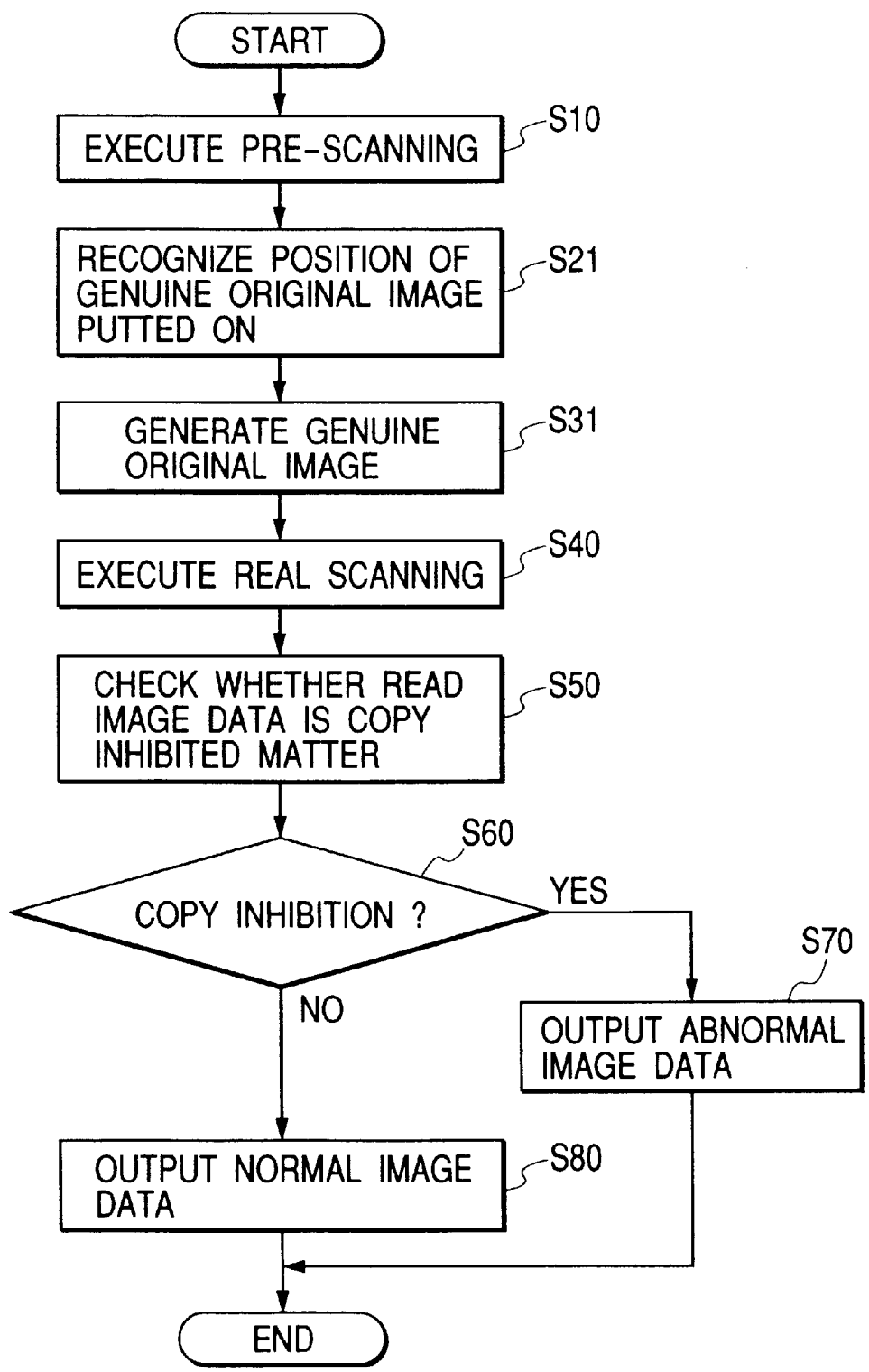
FIG. 20 is a flow chart illustrating the operation according to a fifth embodiment of the invention.
Figure 21:
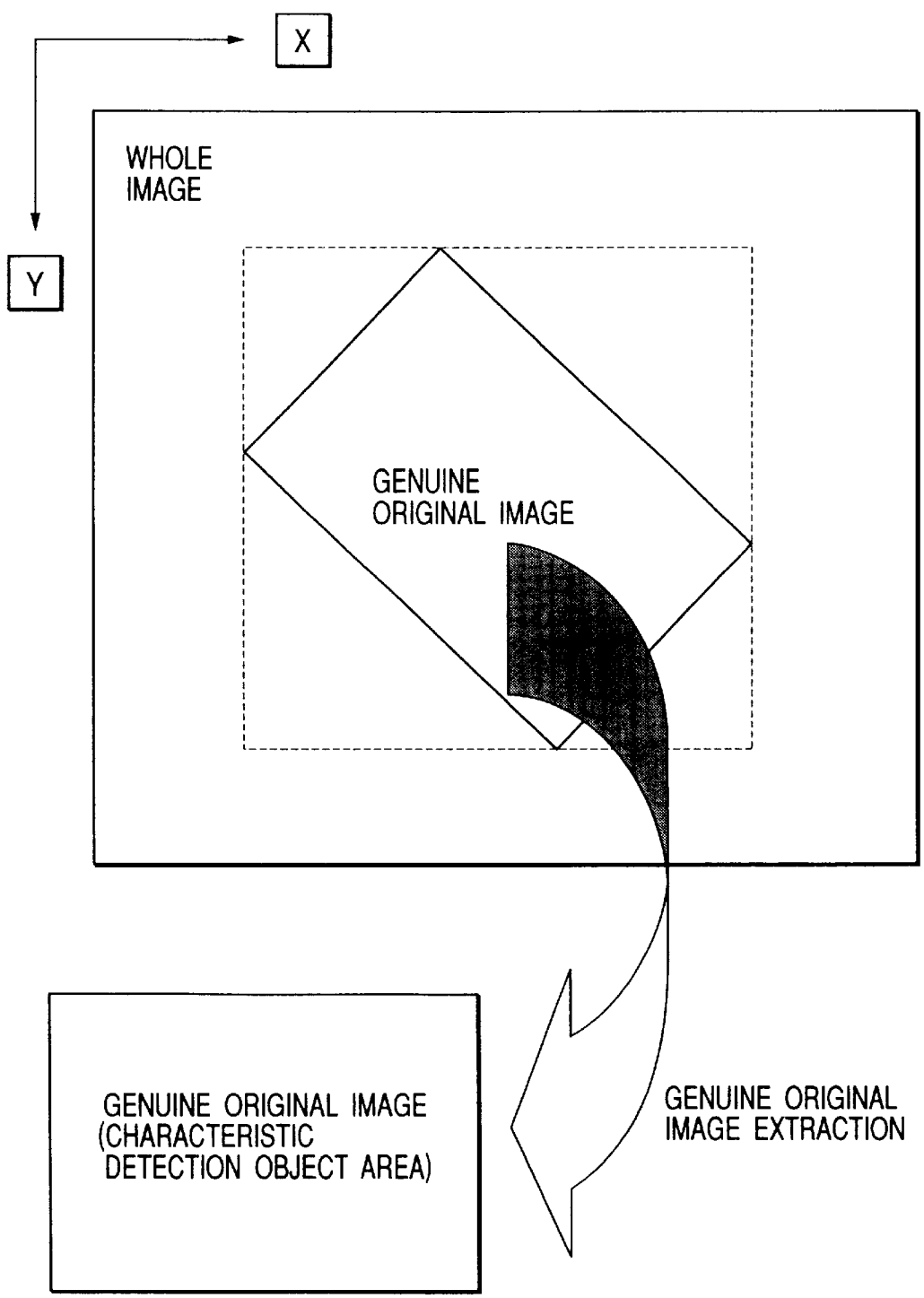
FIG. 21 is a diagram showing a genuine original image in the whole image.

Specifically, Step S20 shown in FIG. 18 is replaced by a process of recognizing the position of a genuine original image placed on the original support at Step 21 shown in FIG. 20. Step S30 shown in FIG. 18 is replaced by a process of generating pure original image data at Step S31 shown in FIG. 20, as illustrated in FIG. 21. In this case, the blank area is reduced further and the process of judging whether the original is a copy inhibited matter can be performed in the smaller read area.

Sixth Embodiment

Figure 22:
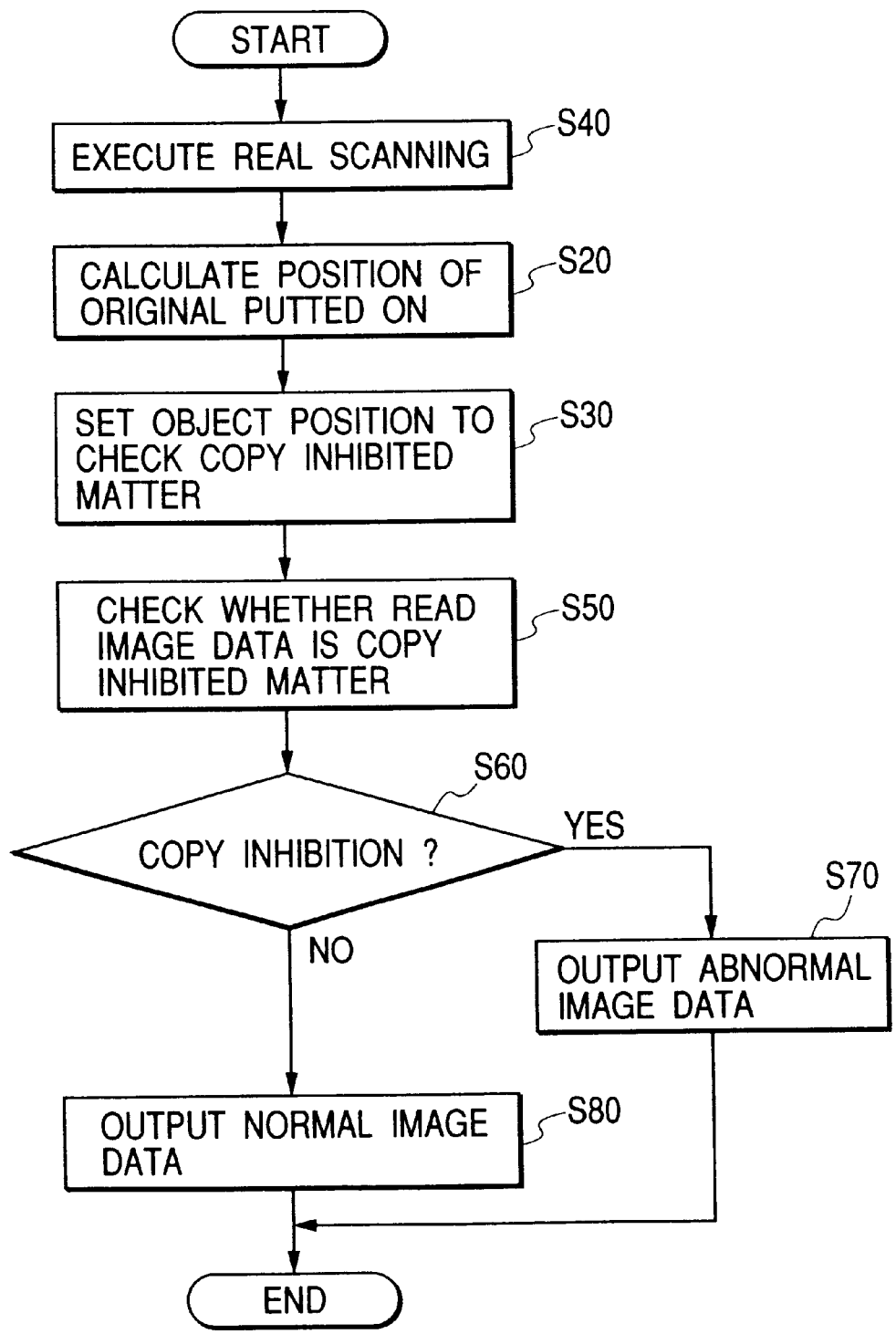
FIG. 22 is a flow chart illustrating the operation according to a six embodiment of the invention.
Figure 23:
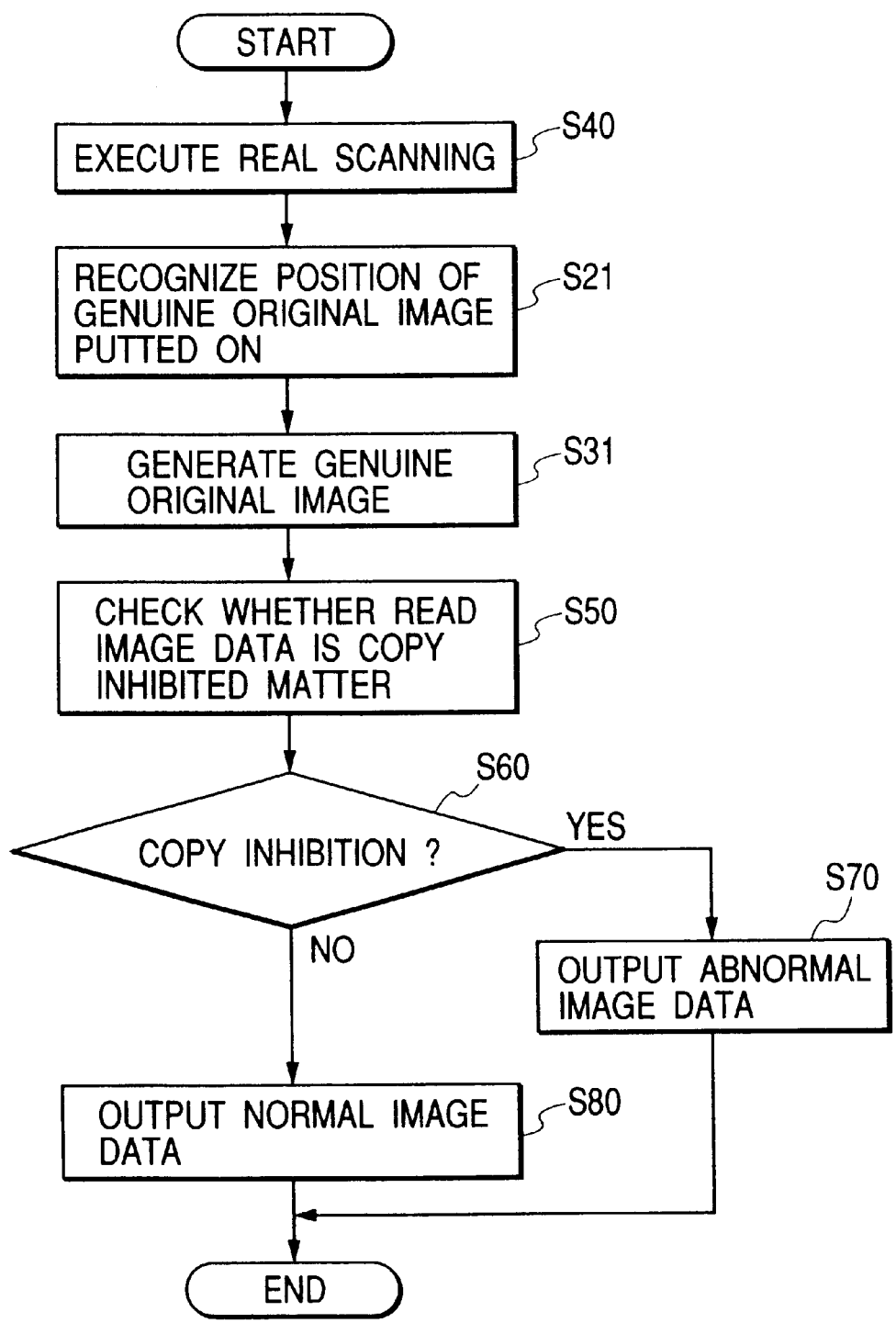
FIG. 23 is a flow chart illustrating the operation following the operation illustrated in the flow chart of FIG. 22.

In the third to fifth embodiments, the position of an original is calculated at Step S20 or S21 by using image data pre-scanned at Step S10. The invention is not limited thereto. Namely, in the sixth embodiment, the real scanning at Step S40 (scanning at a read density designated by an operator) is performed at Step S10 and the read image is stored in RAM 12 or external storage device 18. This image data is used at Step S50 and following Steps. Specifically, as shown in FIGS. 22 and 23, the real scanning is first performed at Step S40 to calculate the position of an original and determine a read area, and thereafter the flow advances to Step S50.

In this case, although it is necessary to use a storage medium having a capacity sufficient for storing the whole image data obtained by the real scanning, it is not possible to change during the real scanning the original during the pre-scanning as in the third to fifth embodiments. Further, the time required for the pre-scanning is omitted.

Seventh Embodiment

In the third to sixth embodiments, the characteristic area of a copy inhibited matter is checked by using image data read with a color scanner. The invention is not limited to color image data read with the color scanner. For example, image data may be supplied from a communication line such as a network via the interface unit 23 shown in FIG. 17, or color image data may be supplied from a removable storage medium (e.g., SmartMedia memory, compact flash memory, magneto optical disc) inserted into an unrepresented drive connected to the image processing system. In this case, the copy inhibited matter characteristic area recognizing program is included in a network program (such as an Internet browser program) and a program for reading image data from the storage medium.

In this case, at Step S10 and Step S40, image data stored in a removable storage medium loaded in an unrepresented storage drive is read via an I/O unit and stored in RAM 12. Namely, as shown in FIG. 18, after image data including original image data is acquired at Step S40, the position of the original is calculated from the acquired image data and blank image data is removed. At Step S10 and Step S40, image data may be acquired via the interface unit for a communication line such as a network and the Internet.

Eighth Embodiment

In the third to seventh embodiments, either the normal image data or the abnormal image data is output to the external storage device 18 (such as a hard disk in the image processing system) via the I/O unit 19 in the form of an image data file. The invention is not limited thereto. Namely, the image data may be output to a color printer connected to the image processing system, or to the outside of the image processing system via the interface unit for the communication line such as a network. In this case, the copy inhibited matter recognizing program is included in a network program and a printer driver.

Figure 24:
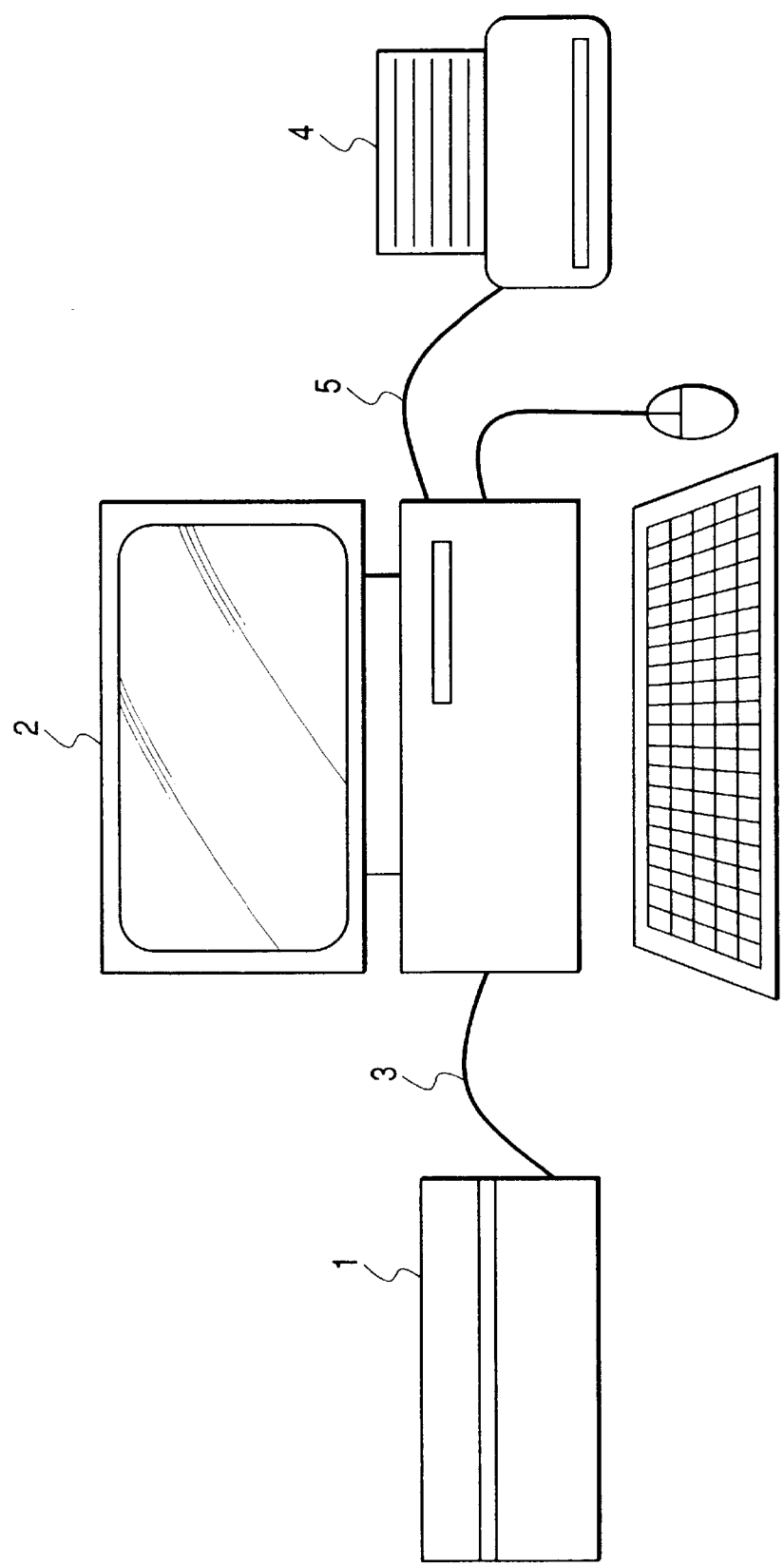
FIG. 24 is a diagram showing an example of an image processing system according to a seventh embodiment of the invention.

An example of an image processing system of the eighth embodiment is shown in FIG. 24. In FIG. 24, reference numeral 2 represents a personal computer as a computer system, reference numeral 4 represents a color printer as an image output apparatus, and reference numeral 5 represents a connection cable for data transfer between the computer system 2 and color printer 4.

Figure 25:
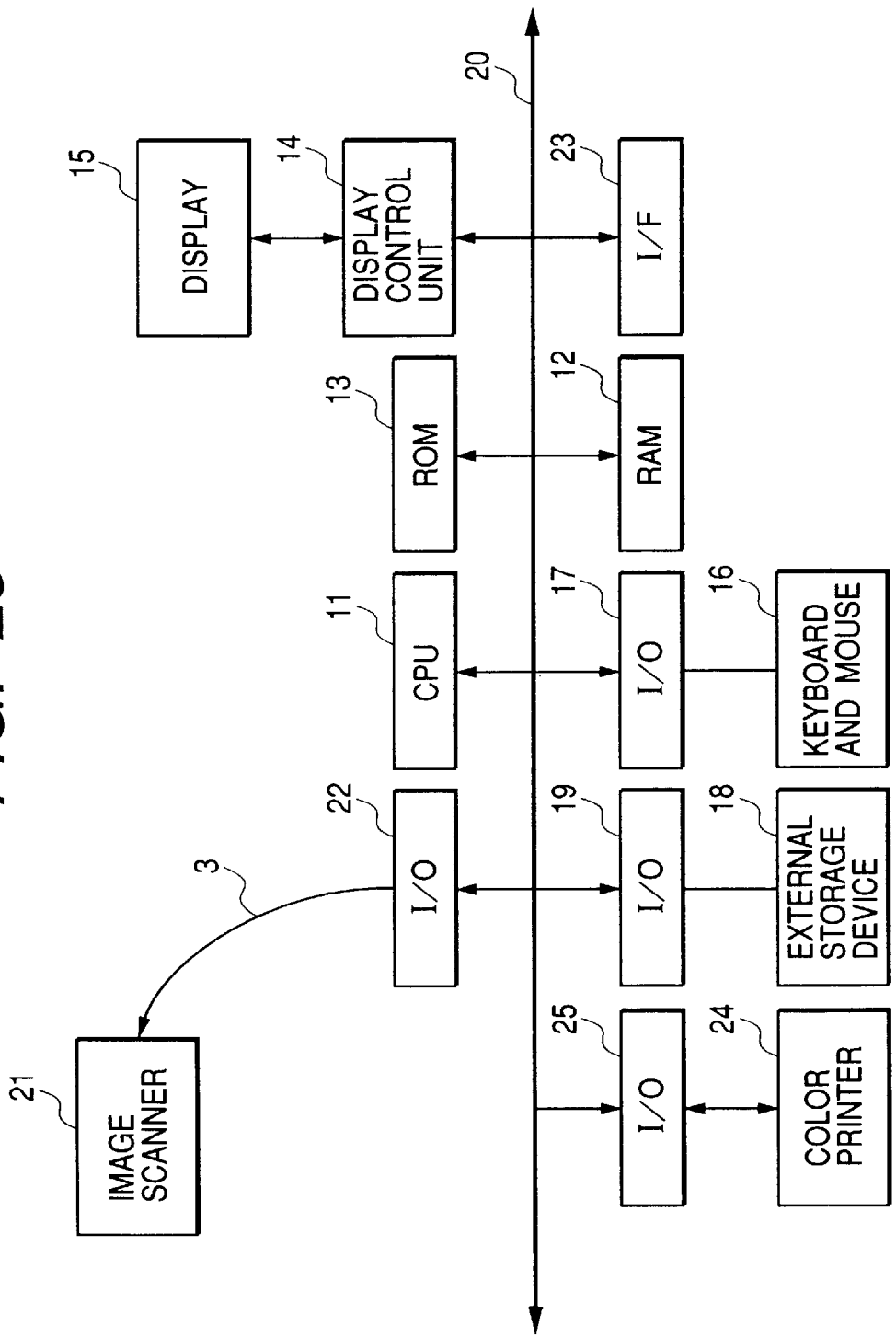
FIG. 25 is a block diagram showing the structure of a main portion of the system shown in FIG. 24.

FIG. 25 is a block diagram showing the main portion of the system shown in FIG. 24 in the form of function modules. In FIG. 25, the image processing system includes an I/O unit 25 for a color printer as an image output apparatus and a color printer 24. The other structures are the same as those shown in FIG. 17. In this embodiment, at Steps S70 and S80 in the flow charts shown in FIGS. 18, 20, 22 and 23, image data is output via the I/O unit 25 to the color printer 24 connected to the image processing system.

At Steps S70 and S80, the image data may be output to the outside of the image processing system via the interface unit for the communication line such as a network.

Other Embodiments

The scope of the invention contains also the case wherein software program codes realizing the function of each embodiment described above are stored in a storage medium and a computer reads and executes the program codes to realize the function of each embodiment. The storage medium itself storing such program codes constitutes the present invention.

The storage medium may be a floppy disk, a hard disk, an optical disk, a magneto optical disk, a CD-ROM, a magnetic tape, a nonvolatile memory card, a ROM or the like.

The scope of the invention also contains not only the case wherein the functions of each embodiment are realized by an OS executing the program codes stored in the storage medium but also the case wherein the functions of each embodiment are realized by an OS executing the program codes in cooperation with other software and expansion boards.

As described above in detail, the present invention has the following advantageous effects. Since the characteristic detection object area in an image is first recognized, the data deriving process can be performed for the minimum necessary image area and the process speed can be increased considerably, as compared to the conventional data deriving process for judging from the whole image whether the image is a copy inhibited matter.

What is claimed is:

1. An image processing apparatus comprising:
   input means for inputting an image from an input image in a band area having a predetermined size as image data;
   area recognizing means for recognizing a predetermined characteristic area from the image data of the band area;
   digital watermark data extracting means for extracting digital watermark data from the image data in the characteristic area recognized by said area recognizing means; and
   processing means for processing the image data corresponding to the image, in accordance with an extracting result of the digital watermark data,
   wherein said digital watermark data extracting means includes correcting means for correcting geometrical alteration added to the characteristic area in accordance with a shape of the characteristic area, wherein the digital watermark data is extracted in accordance with the image data of the characteristic area after correction.

2. An image processing apparatus according to claim 1, wherein said processing means judges from the extracting result of the digital watermark data whether the input image is an image forming inhibited image, and if the input image is an image forming inhibited image, intercepts an input process or a print process for the input image.

3. An image processing apparatus according to claim 1, wherein the characteristic area is an area of a specific color.

4. An image processing apparatus according to claim 1, wherein the characteristic area has a specific geometrical shape.

5. An image processing apparatus according to claim 1, wherein said processing means intercepts an input of the image data of the image if a digital watermark data is extracted.

6. An image processing apparatus according to claim 1, wherein said processing means intercepts a print-out of the image data of the image if a digital watermark data is extracted.

7. An image processing apparatus according to claim 1, wherein the input image is input from an image scanner, a network, or a storage device.

8. An image processing apparatus according to claim 1, wherein said processing means intercepts a print-out of the image data of the input image in accordance with an extracting result of the digital watermark data.

9. An image processing apparatus according to claim 1, wherein said processing means displays an indication representing that the input image cannot be printed, if the digital watermark data is extracted.

10. An image processing apparatus according to claim 1, wherein said processing means executes a print color conversion process and a halftone process for the image data of the image if the digital watermark data is not extracted.

11. An image processing apparatus according to claim 2, wherein a plurality of characteristic areas are formed in the image forming inhibited image.

12. An image processing apparatus according to claim 2, wherein the characteristic areas are formed at four corners of the image forming inhibited image.

13. An image processing apparatus according to claim 2, wherein the characteristic area is formed on front and bottom planes of the image forming inhibited image.

14. An image processing apparatus according to claim 1, wherein the geometrical alteration includes one of rotation, reduction, and magnification.

15. An image processing method comprising the steps of:
   inputting an image from an input image in a band area having a predetermined size as image data;
   recognizing a predetermined characteristic area from the image data of the band area;
   extracting digital watermark data from the image data in the recognized characteristic area; and processing the image data corresponding to the image, in accordance with an extracting result of the digital watermark data, wherein said extracting step includes a step of correcting geometrical alteration added to the characteristic area in accordance with a shape of the characteristic area, wherein the digital watermark data is extracted in accordance with the image data of the characteristic area after correction.

16. A storage medium storing a program realizing an image processing method, the program comprising the steps of:

inputting an image from an input image in a band area having a predetermined size as image data;

recognizing a predetermined characteristic area from the image data of the band area;

extracting digital watermark data from the image data in the recognized characteristic area; and processing the image data corresponding to the image, in accordance with an extracting result of the digital watermark data, wherein said extracting step includes a step of correcting geometrical alteration added to the characteristic area in accordance with a shape of the characteristic area, wherein the digital watermark data is extracted in accordance with the image data of the characteristic area after correction.

17. An image processing apparatus for recognizing a copy inhibited image by executing a program, the apparatus comprising:

input means for inputting image data of an image;

means for determining a characteristic detection object area from the image data input by said input means;

detecting means for detecting a characteristic for recognizing the copy inhibited image from the image data of the image in the characteristic detection object area determined by said determining means; and output means for outputting a signal representative of a detection result by said detecting means, wherein said input means inputs the image data at a pixel density designated by an operator, the input data is stored, and said detecting means detects the characteristic by reading the stored image data in the characteristic detection object area determined by said determining means.

18. An image processing apparatus according to claim 17, wherein the characteristic is represented by an invisible digital watermark, a visible digital watermark, a color spectrum distribution, or an image pattern.

19. An image processing apparatus according to claim 17, wherein a pixel density of the image data input by said input means is coarser than a pixel density of the image data used for the characteristic detection.

20. An image processing apparatus according to claim 17, wherein said determining means determines an inner area including corners of a genuine original image, as the characteristic detection object area.

21. An image processing apparatus according to claim 17, wherein said determining means determines a genuine original image as the characteristic detection object area.

22. An image processing apparatus according to claim 17, wherein the image data is input by pre-scanning, and the image data in the characteristic detection object area is input by real-scanning.

23. An image processing apparatus according to claim 17, wherein when the characteristic is detected, an abnormal image is output, an image is not output, or an indication representing that the input image is a copy inhibited image is displayed on display means, respectively in accordance with an output result by said output means.

24. An image processing apparatus according to claim 17, wherein the image data input by said input means is obtained by scanning the image, from a storage medium, or from a network.

25. An image processing apparatus according to claim 17, wherein the image data of the image is normally output to a storage medium, a printer, or a network if the characteristic is not detected, whereas the image data is abnormally output or the image data is not output if the characteristic is detected.

26. An image processing apparatus according to claim 22, wherein the image data obtained by pre-scanning is compared with the image data obtained by real scanning.

27. An image processing apparatus according to claim 17, wherein the program includes a scan driver, a printer driver, and a program for realizing a communication process for the program.

28. An image processing method for recognizing a copy inhibited image by executing a program, the method comprising the steps of:

inputting image data of an image;

determining a characteristic detection object area from the input image data;

detecting a characteristic for recognizing the copy inhibited image from the image data of the image in the determined characteristic detection object area; and outputting a signal representative of a detection result, wherein said inputting step inputs the image data at a pixel density designated by an operator, the input data is stored, and said detecting step detects the characteristic by reading the stored image data in the characteristic detection object area determined by said determining step.

29. A storage medium storing a program for realizing an image processing method for recognizing a copy inhibited image by executing a program, the program comprising the steps of:

inputting image data of an image;

determining a characteristic detection object area from the input image data;

detecting a characteristic for recognizing the copy inhibited image from the image data of the image in the determined characteristic detection object area; and outputting a signal representative of a detection result, wherein said inputting step inputs the image data at a pixel density designated by an operator, the input data is stored, and said detecting step detects the characteristic by reading the stored image data in the characteristic detection object area determined by said determining step.

30. An image processing apparatus for extracting a digital watermark from an image with the digital watermark embedded in a predetermined characteristic area of the image, the apparatus comprising:

input means for inputting image data of the image;

recognizing means for recognizing the predetermined characteristic area in the image; and extracting means for extracting the digital watermark from the image data in the recognized characteristic area, wherein said extracting means includes correcting means for correcting geometrical alteration added to the characteristic area in accordance with a shape of the characteristic area, wherein the digital watermark is extracted in accordance with the image data of the characteristic area after correction.

31. An image processing method for extracting a digital watermark from an image with the digital watermark embedded in a predetermined characteristic area of the image, the method comprising the steps of:

inputting image data of the image;

recognizing the predetermined characteristic area in the image; and extracting the digital watermark from the image data in the recognized characteristic area, wherein said extracting step includes a step of correcting geometrical alteration added to the characteristic area in accordance with a shape of the characteristic area, wherein the digital watermark is extracted in accordance with the image data of the characteristic area after correction.

32. A storage medium storing a program for an image processing method for extracting a digital watermark from an image with the digital watermark embedded in a predetermined characteristic area of the image, the program comprising the steps of:

inputting image data of the image;

recognizing the predetermined characteristic area in the image; and extracting the digital watermark from the image data in the recognized characteristic area, wherein said extracting step includes a step of correcting geometrical alteration added to the characteristic area in accordance with a shape of the characteristic area, wherein the digital watermark is extracted in accordance with the image data of the characteristic area after correction.

33. An image processing apparatus for recognizing a copy inhibited image by executing a program, the apparatus comprising:

input means for inputting image data of an image;

means for determining a characteristic detection object area from the image data input by said input means;

detecting means for detecting a characteristic for recognizing the copy inhibited image from the image data of the image in the characteristic detection object area determined by said determining means; and output means for outputting a signal representative of a detection result by said detecting means, wherein the image data is input by pre-scanning, and the image data in the characteristic detection object area is input by real-scanning, and wherein the image data obtained by pre-scanning is compared with the image data obtained by real scanning.

34. An image processing method comprising:

inputting image data of an image;

determining a characteristic detection object area from the image data input in said inputting step;

detecting a characteristic for recognizing a copy inhibited image from the image data of the image in the characteristic detection object area determined in said determining step; and outputting a signal representative of a detection result of said detecting step, wherein the image data is input by pre-scanning, and the image data in the characteristic detection object area is input by real-scanning, and wherein the image data obtained by pre-scanning is compared with the image data obtained by real scanning.

35. A storage medium storing a program for effecting a method according to claim 34.

* * * * *

UNITED STATES PATENT AND TRADEMARK OFFICE
CERTIFICATE OF CORRECTION

PATENT NO. : 6,801,636 B2
DATED : October 5, 2004
INVENTOR(S) : Tomochika Murakami et al.

It is certified that error appears in the above-identified patent and that said Letters Patent is hereby corrected as shown below:

Column 3,
Line 28, "an unit" should read -- a unit --.

Column 5,
Line 12, "recognized" should read -- be recognized --.
Line 47, "know" should read -- known --.

Column 14,
Line 26, "positions a" should read -- positions $\alpha$ --.

Column 18,
Line 54, "claim 2" should read -- claim 3 --.

Signed and Sealed this

Fifteenth Day of March, 2005

JON W. DUDAS
*Director of the United States Patent and Trademark Office*